United States Patent [19]

Brems

[11] 4,271,710
[45] Jun. 9, 1981

[54] TOOL CARRIAGE ADVANCE AND RETRACTION CONTROL

[76] Inventor: John H. Brems, 32867 White Oaks Trail, Birmingham, Mich. 48010

[21] Appl. No.: 64,502

[22] Filed: Aug. 7, 1979

[51] Int. Cl.³ ...................... F16H 21/02; F16H 21/52
[52] U.S. Cl. ...................................... 74/27; 408/129; 409/156
[58] Field of Search ...................... 74/27, 661; 173/19, 173/145, 146; 408/10, 129, 132, 133; 409/147, 150, 154, 156

[56] References Cited

U.S. PATENT DOCUMENTS

| | | | |
|---|---|---|---|
| 831,697 | 9/1906 | Barnes | 408/133 X |
| 1,920,228 | 8/1933 | Wood | 173/19 X |
| 2,053,398 | 9/1936 | Kingsbury | 408/133 X |
| 2,630,724 | 3/1953 | Saives | 173/145 |
| 2,756,133 | 7/1956 | Butzin | 74/27 X |
| 2,851,890 | 9/1958 | Jobert et al. | 74/27 X |
| 2,957,368 | 10/1960 | Hendrickson | 74/27 X |
| 3,127,790 | 4/1964 | Howey | 74/661 |
| 3,213,711 | 10/1965 | Van den Kieboom | 74/661 X |
| 3,625,073 | 12/1971 | Dixon et al. | 74/55 |
| 4,115,026 | 9/1978 | Billeter | 408/132 X |

Primary Examiner—Lawrence J. Staab
Attorney, Agent, or Firm—Barnes, Kisselle, Raisch & Choate

[57] ABSTRACT

A machine tool feed system of the type in which a tool supporting sliding carriage is moved toward and away from a workpiece which includes a mechanism for moving the carriage initially in a smoothly accelerated-decelerated rapid advance stroke toward the work and further moving the carriage in the same direction through a predetermined work stroke in a slower feed motion while the tool operates on the work. The mechanism thereafter retracts the tool carriage away from the work in a smoothly accelerated-decelerated rapid return stroke equal in distance to the feed stroke added to the rapid advance stroke. Mechanisms are provided for a first drive for the rapid advance stroke and a second drive for the work stroke, with interconnection with the tool carriage which unlock a portion of the first drive mechanism while initiating the second drive for the work stroke, and regenerating or relocking the interconnectionn during the composite rapid return stroke.

47 Claims, 32 Drawing Figures

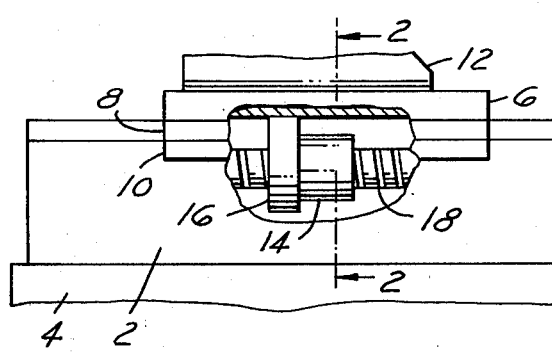
PRIOR ART
FIG.1
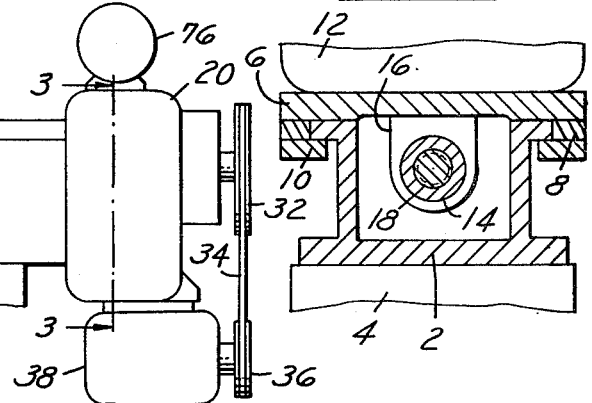
PRIOR ART
FIG.2
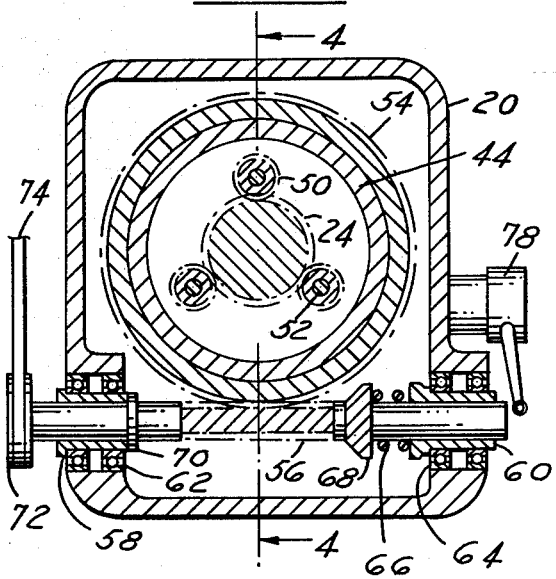
PRIOR ART
FIG.3
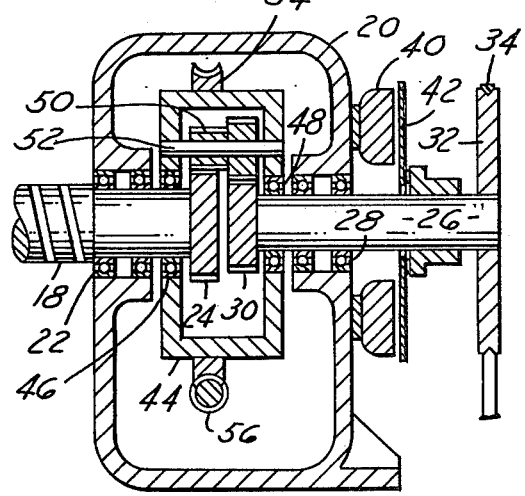
PRIOR ART FIG.4
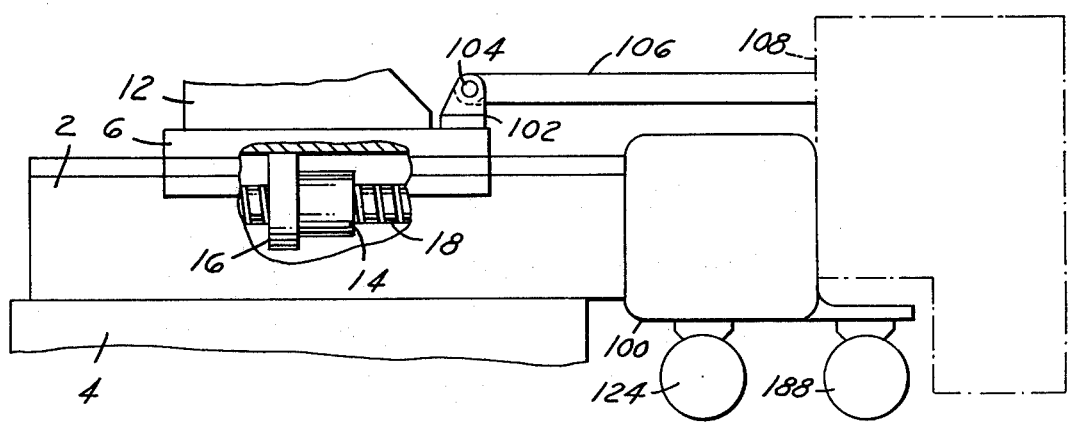
FIG.5

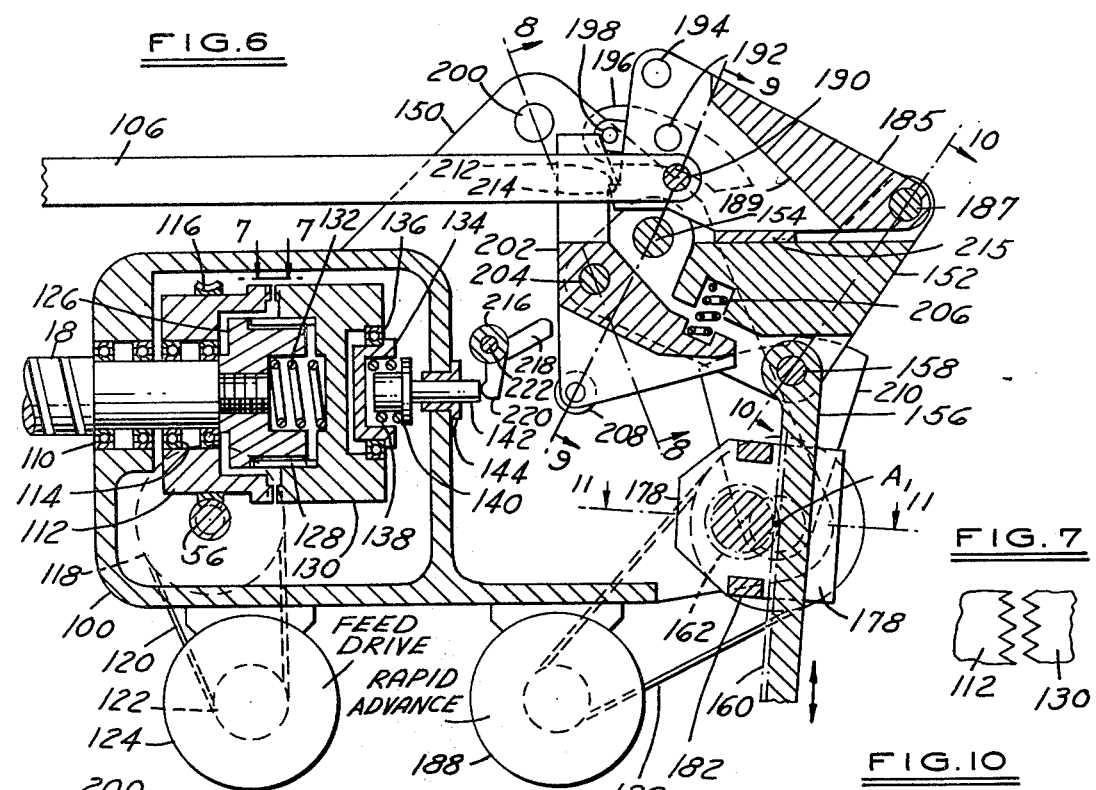
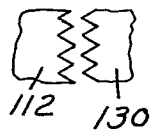
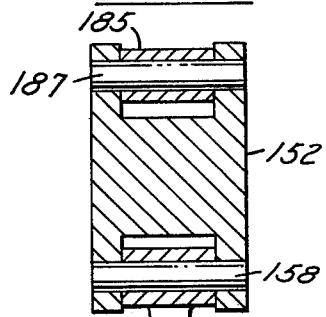
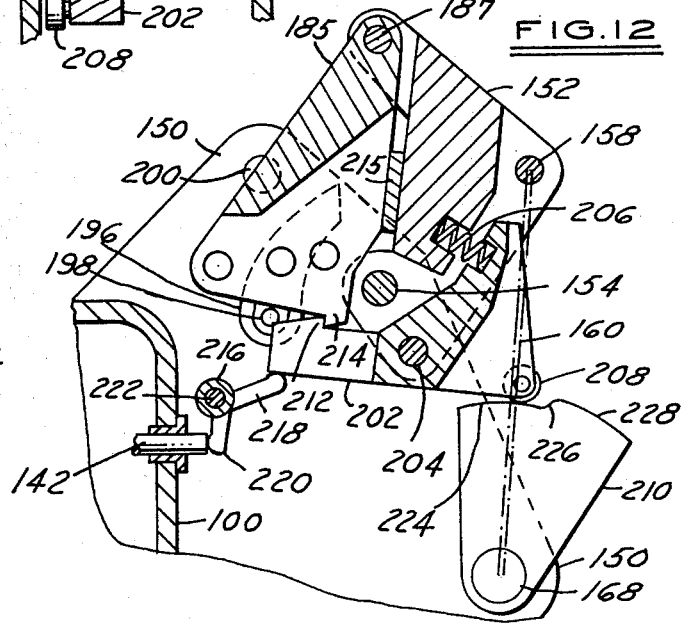
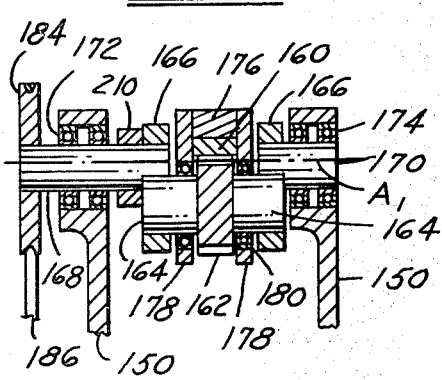

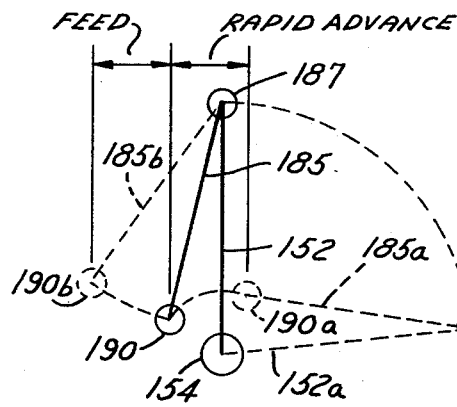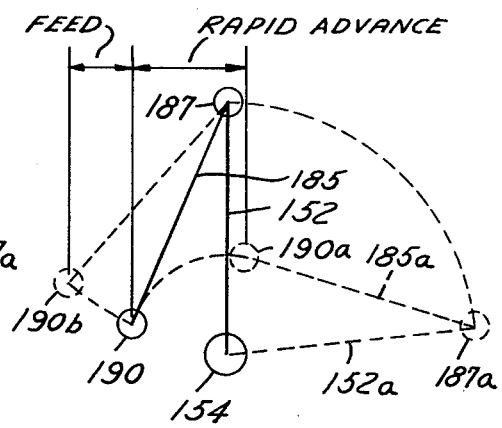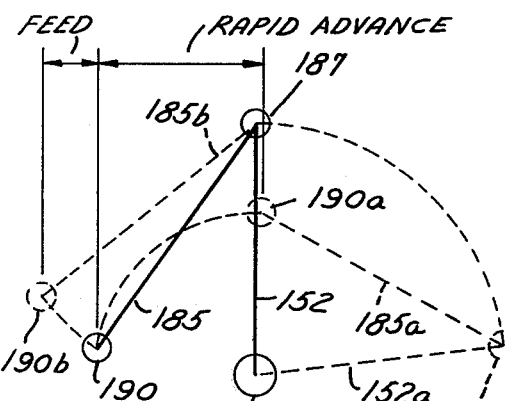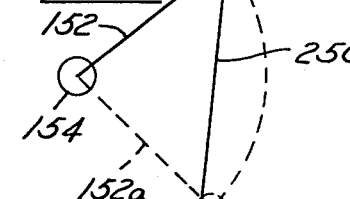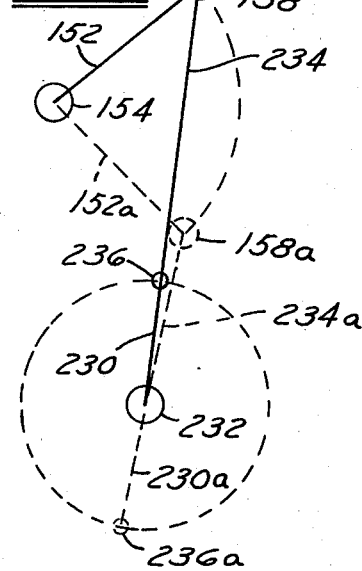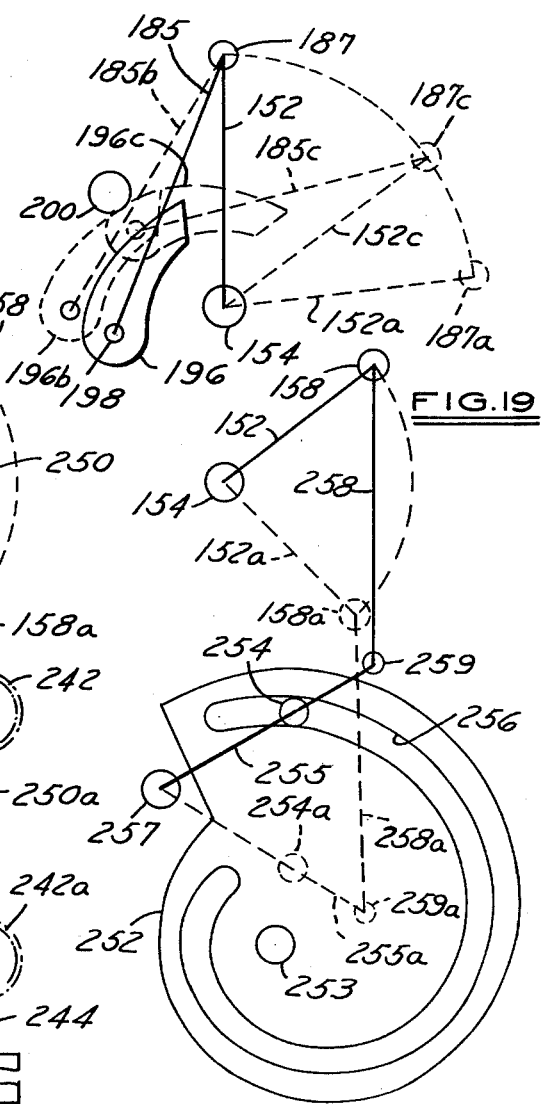

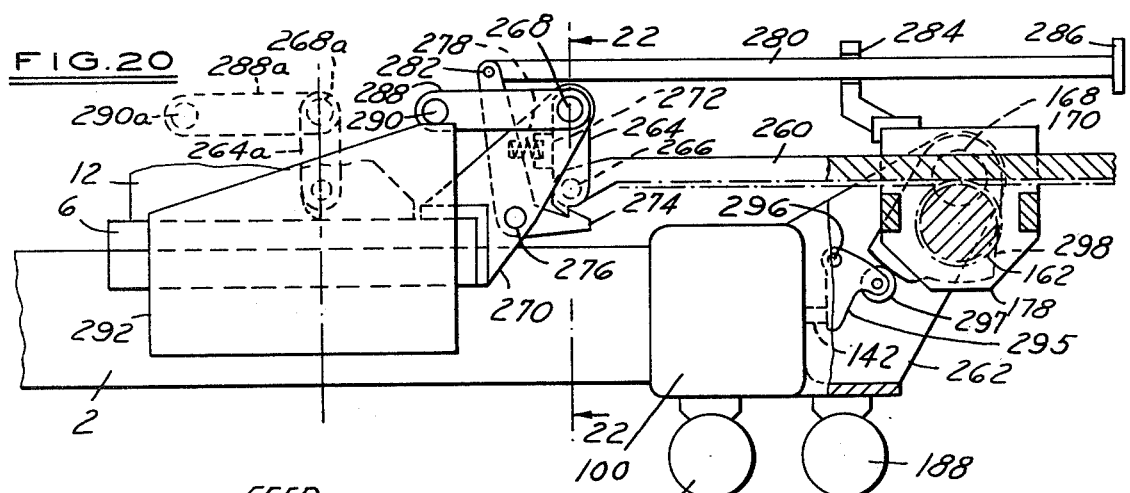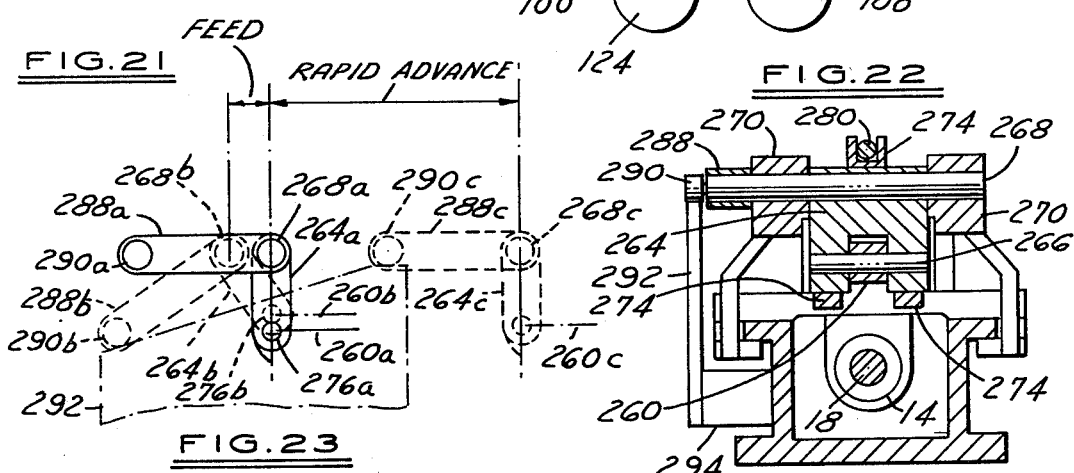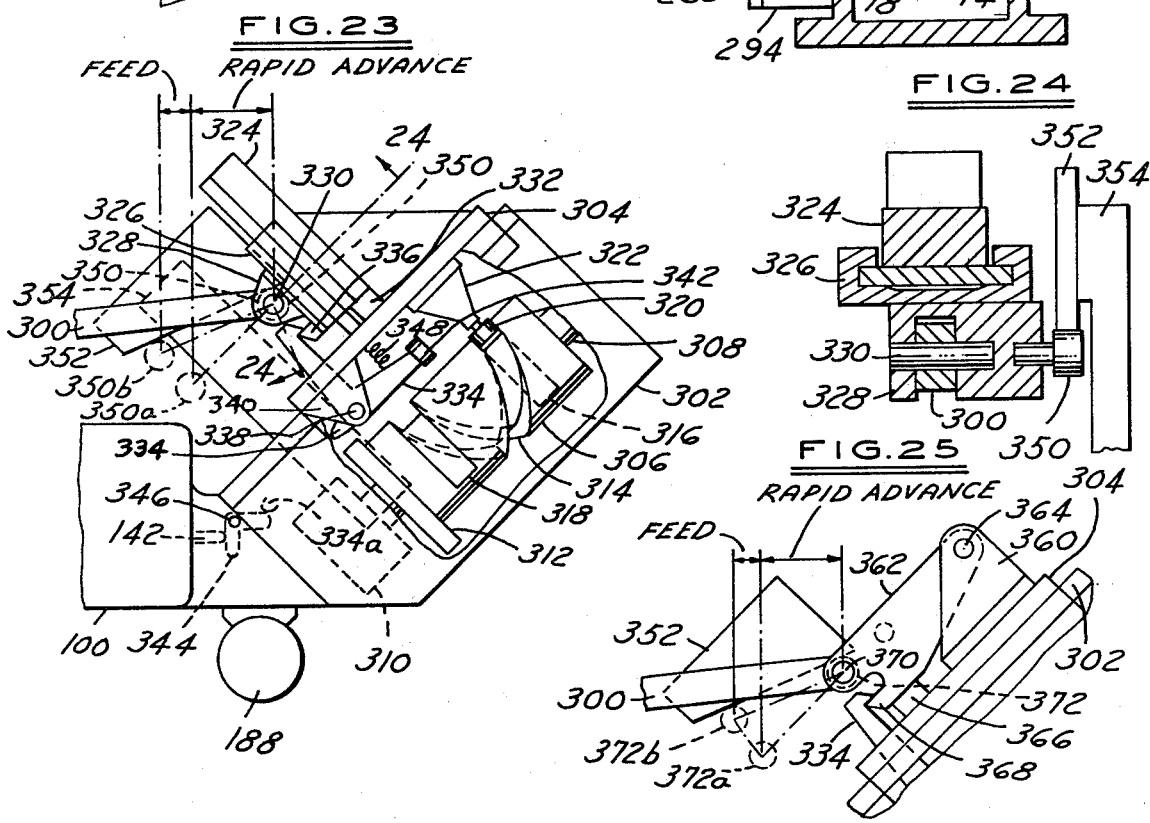

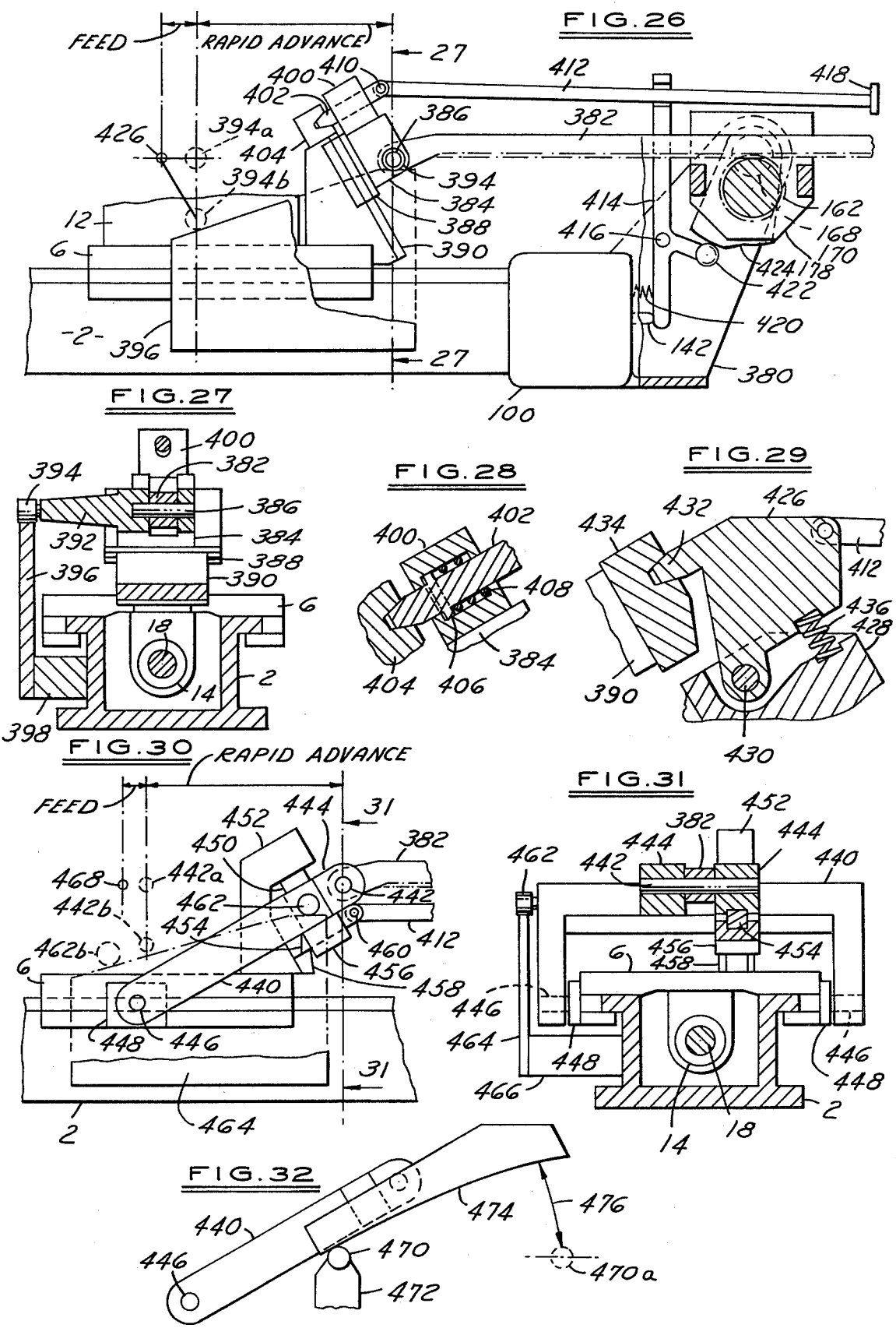

4,271,710

TOOL CARRIAGE ADVANCE AND RETRACTION CONTROL

FIELD OF INVENTION

Metal removal by drilling, reaming, face milling in multiple station equipment where a rotating tool is rapidly advanced to the work, moved in a feed or working stroke while in contact with the work, and retracted to a position wherein the work may be moved to another station.

BACKGROUND OF INVENTION

In multiple station machines referred to sometimes as automation equipment, each station is designed to perform a certain metal removal function. If an engine block is being carried from station to station, it will have some holes drilled at one station, others at another station, some reaming operations at still another station and probably some face milling operations, and so forth. Each metal removing tool must be advanced to the work and then retracted to allow the work to be moved from one station to another. The timing of each operation is important since seconds saved at any one station will accumulate to hours because of the high production figures in many industries.

In this field of multiple station automatic transfer machines used for metal cutting such as milling, drilling, reaming, or tapping, it is common practice to use, in the stations where such operations are performed, systems referred to as slide or way units on which the tool carriages are mounted and are rapidly advanced towards the workpiece, until the tools almost but not quite touch the workpiece, and then shift to a much lower speed to feed the tools into the workpiece for their respective cutting operations.

In conventional mechanically actuated slide or way units, operated through a lead screw or its equivalent, the transition from rapid advance, high speed motion to relatively slow feed motion is accomplished through some type of friction clutch or brake, engaged at high relative speed. This creates a certain range of uncertainty of the exact position from which the tools advance towards the workpiece at feed speed. The same is true if hydraulic feed and retract units are used since exact control is difficult.

It is one object of this invention to provide a system in which the slide or carriage carrying the tools is rapidly advanced towards the workpiece using a predetermined accelerated-decelerated motion, as opposed to the conventional substantially constant speed rapid advance motion which is abruptly decelerated to feed speed.

It is another object of this invention to provide a system in which the transition from rapid advance motion to feed motion is a very exact and reproducible position of the slide or carriage on which the tools are mounted. This not only provides a saving of time but also insures that no tool breakage will occur.

At the end of the feed movement or stroke, it is conventional practice for the tool carriage to be returned to its original starting position through a relatively high speed rapid return stroke. This is generally accomplished by the same constant speed drive mechanism used for the rapid advance stroke and results in very large short acceleration at the beginning of the rapid return stroke and a very high short deceleration at the end of this same stroke.

It is, therefore, another object of this invention to provide a system in which the slide or carriage carrying the tools is rapidly returned to its starting position using an accelerated-decelerated motion having a stroke which is the sum of the previous rapid advance motion and feed motion.

Other objects and features of this invention will be apparent in the following description and claims in which the principles of the invention are set forth together with details directed to those skilled in the art to enable them to practice the invention, all in connection with the best mode presently contemplated.

Drawings accompany the disclosure and the various views thereof may be briefly described as follows:

FIG. 1, a side view of a typical conventional feed unit.

FIG. 2, a section taken on line 2—2 of FIG. 1.

FIG. 3, a section taken on line 3—3 of FIG. 1.

FIG. 4, a section taken on line 4—4 of FIG. 3.

FIG. 5, a functional schematic of a feed unit of this invention.

FIG. 6, a vertical longitudinal midplane section of the drive mechanisms of FIG. 5, shown in the returned position.

FIG. 7, a partial view at arrow 7 of the clutch section of FIG. 6.

FIG. 8, a section taken on line 8—8 of FIG. 6.

FIG. 9, a section taken on line 9—9 of FIG. 6.

FIG. 10, a section taken on line 10—10 of FIG. 6.

FIG. 11, a section taken on line 11—11 of FIG. 6.

FIG. 12, a section through the rapid advance, rapid return mechanism shown at the end of rapid advance.

FIGS. 13, 14, 15, simplified schematic diagrams depicting the linkage movement during various rapid advance and feed strokes.

FIG. 16, a simplified schematic diagram depicting the linkage movement during the rapid return stroke.

FIGS. 17, 18, 19, schematic diagrams illustrating alternate mechanisms for actuating the rapid advance and rapid return linkage.

FIG. 20, a side view of a second embodiment of this invention in which the linkage is mounted on the carriage.

FIG. 21, a simplified schematic of the mechanism of FIG. 20 showing the linkage movement during rapid advance, feed, and rapid return.

FIG. 22, a section taken on line 22—22 of FIG. 20.

FIG. 23, a side view of another embodiment of this invention using slides instead of links.

FIG. 24, a section taken on line 24—24 of FIG. 23.

FIG. 25, a side view of a variation of the mechanism of FIG. 23, which uses one slide and one link.

FIG. 26, a side view of another embodiment of this invention in which the secondary slide is mounted on the carriage.

FIG. 27, a section taken on line 27—27 of FIG. 26.

FIG. 28, an enlarged section of the lock mechanism of FIG. 26.

FIG. 29, an enlarged section of an alternate lock mechanism for FIG. 26 using a pivoted lock lever.

FIG. 30, a partial side view of a variation of the mechanism of FIG. 26 using a simple pivoted link in place of a secondary slide.

FIG. 31, a section taken on line 31—31 of FIG. 30.

FIG. 32, a partial side view of the mechanism of FIG. 30 showing a cam mounted on the link with the cam follower roller mounted on the base.

FIGS. 1, 2, 3 and 4 illustrate a representative configuration of a conventional unit. Referring to FIGS. 1 and 2, a slide base 2 is rigidly mounted to a machine wing base 4. A slide or carriage 6 is slideably mounted thereon and kept in place by spacers 8 and gibs 10. Specific tooling 12 is mounted on the carriage 6 and generally consists of a motor, gear box, spindles and the cutting tools themselves. The carriage 6 is driven in a linear path along the slide base 2 by a ball nut 14 attached to the underside of the carriage 6 through a bracket 16; the ball nut 14 is driven by a ball screw 18 suitably journalled in the slide base 2.

The ball screw 18 in turn is driven by a gearing system housed in a gear box 20. Referring to FIGS. 3 and 4, the driven end of the ball screw 18 is supported by bearings 22 in the gear box 20. A driving sun gear 24 is attached to the end of the ball screw 18 for driving. A rapid advance and rapid return input shaft 26 is journalled in the gear box 20 through bearings 28; on one end is mounted an input sun gear 30 and at the other end is mounted a pulley 32 driven by belt 34 and pulley 36 mounted on the rapid advance, rapid return motor 38 (FIG. 1). An electric brake 40 is mounted to the gear box 20 and actuates a brake disc 42 mounted on the shaft 26; when electrically energized, the brake 40 holds the brake disc 42 stationary and thereby prevents the shaft 26 from rotating.

A planetary carrier 44 is journalled on the ball screw shaft 18 through bearing 46 and to the shaft 26 through bearing 48. Three planetary cluster gears 50 are mounted in the planetary carrier 44 through shafts 52. One of each cluster gear 50 meshes with the gear 30 on shaft 26; the other of each cluster gear meshes with the gear 24 on the ball screw 18. It will be noted that the gear 30 is smaller than the gear 24, and that the sections of the cluster gears 50 are sized accordingly. A worm wheel 54 is mounted on the periphery of the planetary carrier 44; this meshes with a worm gear 56 mounted through sleeves 58 and 60 and bearings 62 and 64 in the gear box 20. The worm gear 56 and sleeves 58 and 60 rotate as a unit with respect to the gear box 20; furthermore, the worm gear 56 can move axially to the right (FIG. 3) by sliding within the sleeves 58 and 60 and by compressing spring 66 which acts between sleeve 60 and shoulder 68 on the worm gear 56. Below a given axial or thrust load on the worm gear 56, the spring 66 causes the shoulder 70 on the worm gear 56 to be positioned against the sleeve 58. The worm gear 56 is driven by a pulley 72, mounted thereon, which is in turn driven through a belt 74 from a feed motor 76 (FIG. 1).

The operation of this mechanism is as follows. From the returned position, the carriage is driven forward at a relatively high speed through a rapid advance stroke. During this movement, the brake 40 is disengaged and the motor 38 drives the shaft 26 through belt 34 and pulleys 32 and 36; the shaft 26 in turn drives the lead screw 18 through gears 30, 50, and 24 which acts as a simple gear train. It can be seen that the reduction through this gear train is relatively small and the angular velocity of the ball screw is about ½ the angular velocity of the input shaft 26; the ball screw 18, rotating at a relatively high speed, drives the carriage 6 to the left (FIG. 1) through the ball nut 14. At the end of the rapid advance stroke, a suitable limit switch (not shown) is engaged by the carriage 6 or tooling 12. The rapid advance motor 38 is turned off and the brake 40 is energized; this stops the shaft 26 through the brake disc 42.

During the subsequent feed stroke, the motor 76 drives the worm gear 56 through belt 74 and pulley 72; the worm gear 56 in turn drives the worm wheel 54 and through it the planetary carrier 44. With the shaft 26 and gear 30 now stationary, the rotation of the planetary carrier 44 drives the ball screw 18 through gear 24 and through the differential planetary gear train consisting of gear 30, cluster gears 50 and gear 24. The overall gear reduction from worm gear 56 to ball screw 18 is very large and the ball screw 18 rotates at a relatively low angular velocity, but with very high applied torque, which is suitable for driving the carriage 6 and the tooling 12 towards the workpiece while the tools are cutting.

At the end of the feed stroke, the carriage 6 encounters a stop which limits its further forward travel; this stalls the ball screw and prevents its forward rotation. The planetary carrier 44 and worm wheel 54 are also stopped; but continued rotation of the worm gear 56, meshing with the stopped worm wheel 54, causes the worm gear 56 to move axially to the right (FIG. 3), compressing spring 66. The outboard end of the worm gear 56 actuates a limit switch 78 stopping the motor 76 completing the feed stroke.

The rapid return stroke is substantially identical with the rapid advance stroke except that the motor 38 rotates in the opposite direction; the brake 40 is again de-energized and the ball screw 18 is driven through gears 24, 50 and 30 from shaft 26. This rapid return stroke is accomplished at substantially the same linear speed as the rapid advance stroke.

It can be seen that both the rapid advance stroke and rapid return stroke are made at a substantially constant velocity, having a sudden acceleration at the start of the stroke due to the energization of the motor 38 and a sudden deceleration at the end of the stroke due to the energization of the brake 40. Furthermore, at the end of the rapid advance stroke, the position of the transition point from rapid advance speed to feed speed is determined by the reproducibility of the braking torque of the brake 40 and brake disc 42. Since this braking torque is dependent on friction, which in turn is influenced by moisture, wear, and other variables, a band of uncertainty arises as to the exact position of the transition point from rapid advance to feed. In practice, this uncertainty in transition point position is compensated for by having the carriage go into feed speed with the tools ¼" to ½" still away from the workpiece. Since the feed speed is considerably less than the rapid advance speed, this early transition increases the total cycle time by about 1-2 seconds as compared to an ideal situation in which the transition point occurs with the tools about 1/32" away from the work. The following mechanisms provide a means of achieving this ideal.

FIG. 5 is a functional schematic of the invention. The slide base 2 is again mounted on a wing base 4 and in turn slidably supports the carriage 6, on which is mounted the tooling 12. The carriage 6 is driven by two alternate means: one means, used for feeding, uses a ball screw 18, ball nut 14, and bracket 16 mounted on the carriage 6, with the ball screw driven by a gear box 100 to be described in detail. The other means for driving the carriage, during rapid advance and rapid return, is through a bracket 102 connected by a pin 104 to a link 106 which is driven by an accelerating-decelerating mechanism within the outline 108, while the ball screw freely turns, being unclutched within the gear box 100.

A section through the gear box 100 is shown in FIG. 6. The ball screw 18 is mounted in bearings 110 in the gear box 100. A clutch shell 112 is journalled on an extension of the ball screw 18 through bearings 114, and a worm wheel 116 is concentrically mounted on its periphery. The worm wheel 116 is driven by a worm gear 56 in a manner substantially identical with the feed drive mechanism shown in FIGS. 3 and 4; i.e., the worm gear 56 is free to move axially against a spring at the end of the feed stroke. The worm gear 56 is driven by a pulley 118 mounted thereon, belt 120, and pulley 122 mounted on the feed drive motor 124.

A driving collar 126 is threaded onto the end of the lead screw 18; this driving collar 126 has splines 128 cut into its periphery onto which is fitted a sliding clutch 130 having mating internal splines. The sliding clutch 130 has serrated teeth cut into its inboard face which are adapted to engage mating serrated teeth in the shell clutch 112 (FIG. 7). The sliding clutch 130 is held out of engagement with the clutch shell 112 by a spring 132 pocketed in the driving collar 126.

An adaptor 134 is concentrically mounted in the sliding clutch 130 through a thrust bearing 136. An engagement spring 138 is pocketed in the adaptor 134 and rests against the shoulder 140 of an actuator plunger 142 which is slidably mounted in a bushing 144 in the housing 100. This plunger 142 is externally actuated, as will be described; when in the position shown in FIG. 6, the plunger is not actuated and the clutch, which is the annular interface between the clutch shell 112 and the sliding clutch 130, is not engaged. Under this condition, there is no driving connection between the feed worm gear 56 and the ball screw 18. This condition exists when the carriage 6 is being driven through link 106 during rapid advance and rapid return. The ball screw 18 is back driven by the ball nut 14, and the ball screw rotates in bearings 110 and 114; the driving collar 126, sliding clutch 130, and spring 132 rotate freely with the ball screw 18.

Stated another way, when the carriage 6 is being driven by link 106 during rapid advance and rapid return, the ball nut 14 moves with the carriage 6 and its axial motion causes the ball screw 18 to rotate; this is possible because of the very low friction characteristics between the ball nut and screw. The ball screw is free to rotate under these conditions because there is no engagement between the sliding clutch 130 which rotates with the ball screw 18 and the clutch shell 112 which is driven by the feed system.

When the plunger 142 is moved to the left (FIG. 6), as will be described, the engagement spring 138 acting on the adaptor 134 moves it to the left also; the adaptor 134 acting on the thrust bearing 136 transmits this motion to the sliding clutch 130 which compresses spring 132. The teeth on the sliding clutch 130 engage the teeth on the clutch shell 112, forming a driving connection therebetween. Under these conditions, i.e., with the plunger 142 displaced to the left, a rotary motion imparted to the worm wheel 112-116 by rotation of the worm gear 56, is transmitted to the ball screw 18 through the clutch shell 112, sliding clutch 130, splines 128, and driving collar 126. This is the condition of the mechanism within the gear box 100 during feed.

One embodiment of the accelerating-decelerating mechanism, 108, is shown in FIGS. 6 and 8-11. Two spaced extensions 150 on the gear box 100 form a structural frame in which the accelerating-decelerating mechanism is mounted. A primary link 152 has bifurcate portions pivoted on a shaft 154 mounted in the spaced extensions 150. The link 152 is connected to a driver link 156 through a pivot connection comprising shaft 158. The extended portion of the driver link is formed into a rack section 160 which meshes with a drive gear 162. This drive gear 162 is formed with two integral stub shafts 164, FIG. 11, which are mounted in spaced cheekplates 166; which in turn are mounted to shafts 168 and 170 which rotate in bearings 172 and 174 mounted in the extensions 150 on an axis $A_1$. The assembly made up of shafts 168 and 170, cheekplates 166, drive gear 162 and stub shafts 164 constitutes a crank and rotates as a unit about axis $A_1$. It will be noted that the axis $A_1$ is substantially coincident with the pitch line of the drive gear 162.

The rack section 160 is maintained in pitch line contact with the drive gear 162 through an assembly made up of a back up plate 176 which is fastened between two side plates 178 journalled on the shafts 164 through bearings 180. The side plates 178 are further interconnected by spacer blocks 182 connected therebetween. The entire mechanism comprised of elements 160-182 constitutes one embodiment of my invention disclosed in U.S. Pat. No. 3,789,676. The shaft 168 is driven by a pulley or sprocket 184 and belt or chain 186 from a rapid advance motor 188, FIG. 6. In many cases, a gear reducer may be interposed between the pulley 184 and shaft 168 or within the electric motor 188 itself. In any case, the rapid advance stroke is created by a single revolution of the drive gear 162 about the axis $A_1$ in the counterclockwise direction (FIG. 6). This causes the rack section to move generally upward through a stroke substantially equal to the pitch circumference of the drive gear 162. Furthermore, for an assumed constant angular velocity of the drive gear 162, during its one revolution, the upward motion of the rack section 160 accelerates smoothly to a maximum velocity at approximately midstroke, and then decelerates smoothly to a stop at the end of the stroke. The upward motion of the rack imparts an angular counterclockwise motion to the primary link 152 about shaft 154.

A slave link 185 is pivotally connected to the master link 152 through a shaft 187. The other end of the slave link 185 is formed into a slot 189 into which is fitted the link 106, whose other end drives the carriage 6. The slave link 185 is pivot connected to the link 106 through a pin 190; this pin connection can be made in the position shown, or the pin 190 can be used in two alternate sets of holes 192 or 194 (FIG. 6) for different rapid advance strokes as will be explained. A cam 196 is attached to one side of the slave link 185 through a pivot pin 198; this cam is bolted to the side of the slave link 185 through slotted holes permitting an angular adjustment of the cam 196 about the pin 198 relative to the slave link 185. This cam 196 will cooperate with a cam roller 200 mounted on one extension 150.

A lock link 202 is pivot connected to the master link 152 through a pivot pin 204. One end of the lock link 202, which is roughly triangular in shape, is adapted to pocket a compression spring 206 which reacts in a pocket in the primary link 152. This spring 206 creates a clockwise torque on the lock link 202 about pivot pin 204 relative to the primary link 152. Another corner of the lock link 202 has mounted on it a cam follower roller 208 (FIG. 9) which will cooperate with a sector cam 210 (FIG. 12) mounted on and rotating with the shaft 168 on axis A₁. The third corner of the lock link 202, slotted to clear the link 106, is formed into a hook or locking section 212, which engages a mating hook or locking section 214 on the slave link 185. With the hook 212 on the lock link 202 engaged with hook section 214 on the slave link 185, the slave link 185 is held against a stop 215 mounted on the primary link 152. In this condition, the slave link 185 and the primary link 152 are locked together by the lock link 202 and comprise, in effect, a single rigid body.

A bellcrank 216, comprised of a horizontal arm 218 and a vertical arm 220 is journalled on a shaft 222 mounted in the extensions 150. This bellcrank 216 comprises the means for mechanically interrelating the feed mechanism housed in the gear box 100 and the accelerating-decelerating mechanism used for rapid advance and rapid return which is comprised of elements 150–215.

At the beginning of the rapid advance stroke, the entire mechanism is in the position shown in FIG. 6. For the rapid advance stroke, the drive gear 162 rotates through one revolution counterclockwise about axis A₁ as previously noted. The accelerated-decelerated upward motion created in the rack section 160 is transmitted to the primary link 152 through shaft 158 causing the primary link 152 to rotate counterclockwise about the fixed shaft 154 through an angle of approximately 80°. At this time, the primary link 152, slave link 185, and lock link 202, rotate as a unit. The pin 187 between slave link 185 and link 106 moves through the same approximate 80° arc about shaft 154 causing the link 106 to move to the left advancing the carriage 6 through a fixed rapid advance stroke.

As the drive gear 162 nears the end of its single revolution, the rack section 160 reaches a dwell position at which time the rack section 160 has reached substantially its full stroke and is substantially stationary, while the drive gear continues to rotate through some small angle, approximately 10°. The position of the mechanism shown in FIG. 12 corresponds to this beginning of dwell position. The rack section 160, shown schematically for clarity, has reached the end of its upward stroke, as has the primary link 152 and slave link 185. At this time, the sector cam 210 mounted on shaft 168 has engaged the roller 208, mounted on the lock link 202, with a lower ramp portion 224. It will also be noted that after the fixed angular rotation of approximately 80° by the primary link 152, slave link 185, and lock link 202, as an assembly, (FIG. 12) that the outer portion of the lock link 202 has just contacted the horizontal arm 218 of the bellcrank 216.

During the final approximate 10° of rotation of the shaft 168 and sector cam 210, with the rack and links in dwell, a transition section on the cam 226 leading to an upper dwell portion 228 engages the cam follower roller 208. This causes the lock link 202 to rotate through a small counterclockwise angle about the pivot pin 204 mounted in the now stationary primary link 152. This small angular rotation of the lock link 202 also causes the hook portion 212 on the lock link 202 to disengage the hook portion 214 on the slave link 185. The downward angular movement of the hook portion of the lock link 202 causes the horizontal arm 218 of the bellcrank 216 to move downward also, rotating the bellcrank 216 clockwise about the shaft 222; this in turn causes the vertical arm 220 of the bellcrank 216 to move to the left also moving the plunger 142 to the left, thereby engaging the clutch mechanism in the gear box 100 as previously described. With the hook portions between the lock link 202 and slave link 185 disengaged, the slave link 185 is now free to rotate to the left about the shaft 187 on the stationary primary link 152.

The feed motor 124 is now energized driving the ball screw 18 through the clutch being held engaged by the plunger 142. The carriage 6 is driven to the left (FIG. 5) and the tooling is fed into the workpiece. As the carriage moves to the left, it pulls the link 106 with it; the link 106 in turn pulls on the now free to rotate slave link 185 to the left about shaft 187. The feed stroke continues for some predetermined and adjustable length, determined by the angular position of the cam 196 on the slave link 185.

At the end of the feed stroke, the cam 196 contacts the cam roller 200, preventing any further rotation of the slave link 185 about shaft 187. A positive stop between the carriage 6 and the slide base 2 may be simultaneously engaged for greater accuracy of location, but this is of no consequence to the mechanism. The carriage, in being prevented from further movement, causes the lead screw to stall, and the worm wheel 56 to move axially as described in connection with the assembly of FIG. 1. This actuates the limit switch 78 de-energizing the feed motor 124 and energizing the rapid motor 188 in the reverse direction to drive the gear 162 in the clockwise direction one revolution to accomplish the rapid return stroke.

During the initial approximate 10° of clockwise rotation of shaft 168 and gear 162, while the rack section is still in dwell, the cam 210 upper dwell section 228 moves away from the roller 208, permitting the spring 206 to move the lock lever 202 clockwise about the pivot pin 204 in the still stationary primary link 152. This relieves the force to the left which had been exerted on the plunger 142 by the bellcrank 216, thereby permitting the spring 132 to disengage the sliding clutch 130 from the shell clutch 112, and the ball screw is again free to rotate as required by the travel of the nut 14.

As the drive gear 162 continues to rotate in the clockwise direction about axis A₁, the rack section 160 accelerates downwards, causing the primary link 152 to rotate clockwise about the shaft 154. The motion of the slave link is controlled by the arcuate path of the shaft 187 through which it is connected to the primary link 152, and the cam 196 reacting against the stationary roller 200. As the shaft 187 moves from its extended position (FIG. 12) to its returned position (FIG. 6), in an arcuate path about shaft 154 the cam 196 on slave link 185 rolling along the roller 200 forces the slave link 185 back against its stop 215 on the primary link 152. As soon as this condition is reached, which occurs after about ⅔ of the return stroke the lock link 202 hook portion 212 re-engages the hook portion 214 on the primary link 152. This forcing of the slave link 185 back to its normal locked position with respect to the primary link 152 by the cam 196 and roller 200 causes the link 106, and the carriage 6 which it pulls back during the rapid return stroke, to move through a stroke which is the sum of the rapid advance stroke and the subsequent feed stroke. This entire combined rapid return stroke is created by the single clockwise rotation of the gear 162, which causes the rack member 160 to make an accelerated-decelerated downward movement equal to its upward movement during rapid advance.

FIGS. 13–16 are simplified schematic drawings, in which the primary link and slave link are represented by straight lines connecting the center of the pivot shaft 187 to the center of pin 190 as it is moved between its three mounting positions. These illustrate the movements and also show how the rapid advance stroke can be changed by shifting the pin 190 into holes 192 or 194. In FIGS. 13-15, the suffix letters "a" denote the element positions in the returned position and the elements are shown dotted; no suffix letters show the elements at the end of rapid advance and prior to feed and are shown by solid lines; the suffix letter "b" denotes the element positions at the end of feed and are again shown dotted.

Referring to FIG. 13, the pin 190 is shown in the lowermost hole corresponding to its location in FIGS. 6 and 12. During rapid advance, the primary link is moved through a fixed angle from 152a to 152; the slave link from 185a to 185; and the pin from 190a to 190. The horizontal projection of the movement of pin 190 (connected to link 106) is substantially equal to the rapid advance stroke imparted to carriage 6. During this interval, the primary link and slave link operated as a locked pair. At the end of rapid advance, the slave link 185 is unlocked from the primary link as previously explained; the carriage 6 is moved forward by the ball screw and ball nut and the now unlocked slave link is pulled forward by link 106 from position 190 to 190b, pivoting about the shaft 187 on the now stationary primary link 152. The feed speed is controlled by the ball screw. At the end of this feed stroke, the position 185b is reached by the slave link. During the return stroke of the primary link 152a, the slave link is returned to its locked position at 185a as will be shown in FIG. 16.

Referring to FIG. 14, the sequence described in connection with FIG. 13 still applies. However, the pin 190 which connects the link 106 to the slave link has been moved to an alternate hole 192 (FIG. 6). This has the effect of increasing the radius of the connecting point of link 106 to the slave link 185 from the center of rotation of the linkage assembly which is shaft 154. Accordingly, even though the primary link 152 rotates through the same angle as before (FIG. 13), the horizontal projection of the movement of the path of pin 190 has increased due to the larger radius of its path. This can be noted by comparing the rapid advance strokes between FIGS. 13 and 14.

Similarly, a still larger rapid advance stroke can be achieved, as is shown in FIG. 15, by moving the pin 190 to a still larger radius at hole 194 (FIG. 6) which is the representation of FIG. 15.

It can be seen, therefore, that the length of the rapid advance stroke can be adjusted in discrete intervals by shifting the pin 190 between various holes in the slave link 185. The position of the rapid advance stroke can be controlled by making the length of the link 106 variable by a variety of common techniques, among which is making the link 106 out of two pieces, with one end threading into the other.

The behavior of the slave link relative to the primary link is demonstrated schematically in FIG. 16, and applies equally well to any position of the pin 190 in the slave link. As before, the primary link rotates from a position 152a to a position 152 during the rapid advance stroke. The slave link, now represented by a line connecting the shaft 187 to the cam hinge pin 198, moves to a position 185, and cam 196 moves to a position 196 during this same rapid advance stroke. During feed, the slave link is moved from position 185 to position 185b and the cam mounted thereon moves from position 196 to 196b. It will be noted that at the end of feed stroke, the cam 196b butts against the fixed roller 200. During the rapid return stroke, the shaft 187 retraces its arcuate travel back to position 187a. During the first approximate two-thirds of this rapid return stroke, the fixed roller forces the cam 196 and the slave link 185 on which it is mounted back into the locked position with respect to primary link 152, which condition is achieved with the primary link at 152c, the slave link at 185c and the cam at 196c. It is evident that the length of the feed stroke is determined by the amount that the slave link is permitted to rotate about the shaft 187 after the end of the rapid advance stroke, and that the amount of this rotation is determined by the angular position of the cam 196 on the slave link 185 about the pin 198. Regardless of any specific position of the cam 196 about the pin 198, it can be seen that the cam 196 and slave link 185 will be driven to their locked position with respect to the primary link 152 at that point during the rapid advance stroke that the roller 200, pin 198 and shaft 154 are colinear which is the position designated by the suffix "c". This must be so since that portion of the cam 196 adjacent to the pin 198 is a true radius about the center line of pin 198.

In the embodiment described above, the basic accelerating-decelerating mechanism used to actuate the rapid advance and rapid return linkage system was one embodiment of my invention disclosed in U.S. Pat. No. 3,789,676. Other mechanisms could also be used. Several such alternatives are schematically shown in FIGS. 17-19. It will be understood that the primary link 152 in each of these diagrams is represented as a line connecting the center of rotation, shaft 154, with the shaft 158 to which the input force is applied and the suffix letter "a" is applied to all elements in their returned position and no suffix letter is used for the elements in their advanced position.

Referring to FIG. 17, a crank arm 230 is mounted on a rotatable shaft 232 capable of supplying the torque required for the application, as, for example, the output shaft of a gear reducer mounted on the gear box 100 and driven by a motor such as 188. At the outboard end of the crank arm 230 is journalled a connecting rod 234 through a crankpin 236; at its other end, the connecting rod is pivotally connected to the primary link 152 through the shaft 158. In one position of the crank 230a, the connecting rod 234a holds the primary link 152 in its returned position 152a. As the crank arm rotates from position 230a to position 230, the primary link is driven from position 152a to position 152 executing the rapid advance stroke. Similarly, as the crank arm rotates from position 230 to 230a, the primary link 152 returns to position 152a executing the rapid return stroke. It will also be understood that a cam such as cam 210 (FIG. 6) will be mounted on the shaft 232 to actuate the lock link 202 as previously described.

Another illustrative mechanism suitable for actuating the primary link 152 is schematically shown in FIG. 18. This actuating mechanism is one embodiment of my invention disclosed in U.S. Pat. No. 3,777,580. A fixed gear rack 240 is suitably supported on the gear box 100; a moving gear 242 is suitably held in mesh with the gear rack 240 as it rolls along said rack between two end positions 242 and 242a which are spaced one pitch circumference of said gear apart. The gear is driven between these two positions by a rod 244 driven by a cylinder 246 mounted to gear box 100. A crankpin 248 is mounted to gear 242, with the center line of the crankpin on or near the pitch line of the gear. A connecting rod 250 is pivotally connected at one end to the crankpin 248, and pivotally connected at its other end to the primary link 152 through shaft 158. As the gear is rolled along the stationary rack 240 through one revolution, as driven by the cylinder 246, it moves from position 242a to position 242. This causes the connecting rod and primary link to move from 250a and 152a to positions 250 and 152 in a smoothly accelerated-decelerated motion even though the rod 244 moves at a constant velocity. In this case, the lock link would be actuated by a push point on the assembly used to maintain the rolling gear in pitch line contact with the rack.

FIG. 19 is a schematic drawing of a plate cam system for actuating the primary link 152. A plate cam 252 is mounted on a driving shaft 253 such as the output shaft of a suitable gear reducer. A roller 254 mounted on an arm 255 operates in a groove 256 milled in the plate cam 252. The arm 255 is journalled on a shaft 257 mounted in the frame, and the outboard end of the arm 255 is connected by a link 258 to the primary link 152 through a pivot pin 259. The cam groove 256 is contoured to impart a smoothly accelerated-decelerated motion to the primary link 152 for a constant angular velocity rotation of cam 252 about its driving shaft 253.

The cam 252 is shown in a single position corresponding to the position of the primary link 152 after the rapid advance stroke; it will be understood that this position of the cam 252 was reached after 270° of clockwise rotation from its returned position, which is not shown for clarity. In this returned position of the cam 252, the roller is in position 254a, the arm is in position 255a, and the link is in position 258a.

During the rapid return stroke, the cam 252 is rotated 270° counterclockwise by the shaft 253 returning the roller back to position and the primary link back to position 152a.

It will be noted that the angle of movement of the primary link 152 in the mechanism of FIGS. 17–19 is the same as the angle of movement of that same link in FIGS. 6 and 12. It will also be understood that the behavior and sequencing of the slave link 185, lock link 202, and their associated mechanisms is the same as previously described.

Another embodiment of this same invention is shown in FIGS. 20–22. This employs the same principles as the previous embodiments except that a portion of the mechanism has been transferred to the carriage itself.

Referring to FIGS. 20–22, a side base 2 mounts a sliding carriage 6 on which is mounted the tooling 12, as in the previous embodiments. For the feed stroke only, a ball screw 18 in the base (See sectional view in FIG. 22.) drives the carriage 6 through a ball nut 14, and this lead screw is driven by a mechanism substantially identical with the ball screw drive mechanism housed in the gear box 100 of FIG. 6. The accelerating-decelerating mechanism, which is one embodiment disclosed in my U.S. Pat. No. 3,789,676, and which is shown in section in FIG. 11 is again employed, but in this embodiment, it is oriented such that the direction of motion of the rack section 260 is substantially parallel to the direction of motion of the carriage 6. The shafts 168 and 170 (FIG. 11, FIG. 20) are journalled in revised spaced frame extensions 262 from the gear box 100, and the drive motor 188 is still employed to drive this mechanism.

As before, the stroke of the rack section 260 from dwell to dwell is equal to the pitch circumference of the drive gear 162 and is to the left when the gear 162 is rotated counterclockwise and to the right when the gear 162 is rotated clockwise. The driving end of the rack section 260 is connected to a vertical lever 264 through a pivot pin 266; the other end of the vertical lever is keyed or splined to a shaft 268 journalled in a bracket 270 mounted on the rear of the carriage 6 (FIG. 20).

During rapid advance, the vertical lever 264 rests against a stop 272 mounted on bracket 270; the vertical lever 264 is held against the stop 272 by an L-shaped lock link 274 pivot mounted on the bracket 270 through a pin 276.

A compression spring 278 operating between the back of the stop 272 and the lock link 274 exerts a counterclockwise torque on the lock link 274 maintaining a latched condition between a hook section on the lock link 274 and a hook section on the bottom of the vertical lever 264. An actuator rod 280 is connected at its one end to the top of the lock link 274 through a pin 282. The other end of the rod 280 passes through a clearance hole in a bracket 284 mounted on the side plates 178 of the accelerating-decelerating assembly. The extreme rear end of the rod carries a cap enlargement 286. The shaft 268 extends beyond the bracket 270 on one side, FIG. 22, and a horizontal lever 288 is splined or keyed thereon; the outboard end of this horizontal lever 288 carries a roller 290 which cooperates with a cam plate 292 supported from the slide base 2 through a spacer 294.

The clutch mechanism internal to the gear box 100 is substantially identical with the clutch mechanism of FIGS. 6 and 7; it is again actuated through a plunger 142, which when moved to the left, connects the feed drive ball screw to its drive motor 124, and when returned by spring action to the right, allows the ball screw to rotate freely. The plunger 142 is actuated by a bellcrank 295 journalled on a shaft 296 mounted in the frame extension 262. A cam follower roller 297 is mounted on the bellcrank 295; this roller 297 is actuated by a face cam 298 mounted on the shaft 168. The cam 298 is formed with a ramp such that when the rack 260 is in a dwell position, the cam 298 acting through roller 297 and bellcrank 295 depresses the plunger 142 (move to the left) which engages the clutch mechanism in gear box 100. When the rack 260 is in a non-dwell position, the cam permits the plunger 142 to be in its extended position, and the clutch is disengaged. It will be noted that in this type of arrangement, the plunger 142 is depressed and the clutch is re-engaged in the dwell in the return position at the end of the rapid return stroke and before the next rapid advance stroke (which was not the case in the mechanism of FIGS. 6 and 12) but this is no disadvantage since the carriage is stationary anyhow.

The mechanism in FIG. 20 is shown in its returned position prior to the rapid advance stroke. For the rapid advance stroke, the gear 162 rotates one revolution counterclockwise, driving the rack section to the left through a stroke equal to the pitch circumference of the gear 162; this drives the carriage 6 through an equal stroke through the vertical lever 264, stop 272, shaft 268 and bracket 270. During the dwell at the end of this stroke, the cap 286 on rod 280 contacts one face of the bracket 284, and, through the movement of the sideplates 178 and bracket 284 to the right, which occurs during this dwell, moves the rod 280 to the right a small amount. It will be noted that prior to the rapid advance stroke, the distance from the bracket 284 to the cap enlargement 286 was substantially equal to that stroke.

As the cap 286 is driven to the right by the bracket 284, the rod 280, acting in tension, moves the top arm of the L-shaped lock link 274 in a clockwise direction about the pin 276, compressing spring 278. The hooked section of the lock link 274 moves downward disengaging from the hooked section on the lower end of the vertical link 264. Simultaneously, the cam 298 on the shaft 168 operates the bellcrank 295 through roller 297 which actuates the plunger 142 (FIG. 6) in the gear box 100; this in turn, it will be recalled, actuates the clutch to initiate the driving of the ball screw 18. At this time, i.e., end of the rapid advance stroke and prior to the feed stroke, the vertical lever 264, the shaft 268, the horizontal lever 288 and roller 290 have taken the positions designated by the suffix letter "a", i.e., 264a, 268a, 288a, and 290a, respectively, in FIG. 20. This position status has been transferred vertically downward into FIG. 21 for clarity in describing the subsequent movements.

The feed motor 124 is now energized and the motor 188 is de-energized. The carriage 6 is driven further to the left (forward) by its ball screw drive for the feed stroke, while the rack 260 remains stationary. This forward motion of the carriage 6 and the bracket 270 mounted thereon moves with it the shaft 268. Referring to FIG. 21, this shaft moves from a horizontal position 268a to a rotated position 268b (the suffix letter "b" applies to any element position after the feed stroke;). This movement of the shaft 268, while the rack 260 is held from longitudinal movement by the now stationary gear 162 causes the vertical lever 264 to rotate counter-clockwise from position 264a to position 264b. It will be noted that this requires a slight upward movement of the rack 260, shown by its centerline only in FIG. 21, from position 260a to position 260b; this is permissible since the rack 260 can change its angular position in space by rolling on the stationary gear 162. The horizontal lever 288 also is driven counterclockwise, through shaft 268 from vertical lever 264, through the same angle as vertical lever 264, from the position 288a before feed to position 288b after feed. In this latter position, the roller 290 reaches a position 290b contacting the cam 292, which prevents further rotation of levers 288 and 264 and stopping any further forward movement of the carriage 6. Again, for high precision applications, the carriage 6 may engage a positive stop on the slide base 2 slightly before or simultaneously with the roller 290 contacting the cam 292.

In any case, the feed is stopped at this point, because the ball screw 18 is prevented from further rotation, the worm gear 56 moves axially to trip limit switch 78, as previously described in connection with FIG. 3, and the feed motor 124 is de-energized, completing the feed stroke.

To accomplish the rapid return, the motor 188 is energized in the opposite direction than for the rapid advance, and the drive gear 162 is rotated one revolution clockwise. As the shaft 168 and gear 162 start their clockwise rotation, the plunger 142 (FIG. 6) releases the internal clutch system and the ball screw is again permitted to rotate freely as it had been during rapid advance. The rack 260 moves to the right through a stroke equal to the stroke it made to the left during the rapid advance stroke. The rack 260 pulls the carriage through the vertical lever 264, shaft 268, and bracket 270. The vertical lever 264 starts the rapid return stroke from the position 264b it had reached at the end of feed. However, as the carriage 6 moves to the right, the roller 290, starting from the position 290b moves up the straight line angular cam surface of the cam 292. This forces the horizontal lever, starting from its position 288b, to rotate clockwise about the shaft 268 as it moves to the right. This clockwise rotation of the shaft 268 forces the vertical lever 264 to rotate clockwise also making the shaft 268 (and the carriage 6 to which it is attached by bracket 270) move further to the right than the movement of the rack 260 attached to the bottom of the vertical lever through pin 276. This is a regenerative or adding type motion caused by the superposition of the angular clockwise motions of the horizontal and vertical levers 288 and 264 on their translation, both of which are created by the movement of the rack 260 to the right.

Stated another way, when the rack 260 is moved some given increment to the right by the gear 162 (or any other prime mover), this creates an equivalent first component movement to the right of the vertical lever 264, horizontal lever 288, shaft 268, bracket 270 and carriage 6; and this first component movement forces the levers 264 and 288 to rotate clockwise about shaft 268 as the roller 290 is driven upward by cam 292; and this clockwise rotation of the vertical lever 264 induces a second component of movement (to the right) of shaft 268, bracket 270, horizontal lever 288, and carriage 6 with respect to the rack 260.

This induced second component of movement, caused by the lever rotations, is superimposed or added to the first component movement caused by their translation. Therefore, for any given increment of movement of the rack 260 to the right (return) the carriage 6 will be moved through that same increment, plus an additional amount that is dependent on the slope of the cam 292. With a substantially straight cam slope as shown, the total amount of additional carriage 6 movement with respect to the rack 260 due to the rotation of levers is substantially proportional to the first component movement of the rack itself. The motion of the rack itself is a smoothly accelerated-decelerated motion created by the drive gear 162; the return motion of the carriage 6 is an amplified, i.e., having a greater stroke, movement having these same smoothly accelerated-decelerated characteristics.

At the end of the rapid return stroke, as designed by the suffix "c" on the relevant elements, FIG. 21, the cam 292 has caused the roller 290c to return the horizontal lever back to its original horizontal position as shown at 288c. This movement, transmitted through shaft 268, has returned the vertical lever back to its original position at 264c, and the lock link 274, in response to the torque imposed on it by the spring 278, re-engages its hook section with the hook section at the bottom of the vertical link 264. The vertical lever 264, shaft 268 and horizontal lever 288 are again locked with respect to the bracket 270, and the mechanism is ready for the next rapid advance stroke. It will be noted that for this to occur, the right end of the cam 292, contacted by the roller 290 when the carriage is in its returned (rightmost) position, must be at a level sufficiently high to drive the horizontal lever 288 into its returned or horizontal position. This point on the cam is therefore common for all amounts of feed.

Referring to FIG. 21, it can be seen that the amount of the feed stroke is determined by the amount the levers 264 and 288 are permitted to rotate, after the end of the rapid advance stroke; and that the amount of this rotation is controlled by the height of the contact point of the roller 290 with the cam 292, as illustrated by roller position 290b. The higher this position, the less the feed; indeed, if the top surface of the cam were horizontal, no feed would be permitted. Therefore, the amount of the feed is controlled by the slope of the upper surface of the cam 292, and where an adjustable feed is desired, the cam 292 can be adjustably mounted with respect to the slide base 2, with the remaining provision that the right end of the cam 292 must be sufficiently high to drive the roller 290 to its returned position as shown by position 290c.

In the embodiment of FIGS. 20, 21 and 22, the prime mover for the rapid advance and rapid return motions is one embodiment disclosed in my U.S. Pat. No. 3,789,676. It will be understood that other types of mechanisms may be utilized, such as those shown in FIGS. 17–19 while still retaining the regenerative or adding mechanism of FIGS. 20–22.

Another embodiment of this same invention is shown in FIGS. 23 and 24. It will be understood that the gear box 100 is attached to the slide base 2 on which is mounted a carriage 6; that this carriage is driven for feed only by a ball screw 18 and nut 14, and that the ball screw is driven through a clutch mechanism all as described in FIG. 6. Furthermore, the carriage 6 is driven, for rapid advance and rapid return, by a link 300, attached thereto through a bracket such as 102 (FIG. 5).

Referring to FIGS. 23 and 24, a frame extension 302 on the gear box, comprises a slide base on which is mounted a primary slide 304 operating along a plane inclined approximately 45° to the plane of carriage 6 travel. A cylindrical cam 306 is mounted on a shaft 308 journalled in the frame extension and driven by an internal gear reducer 310, in turn driven by the motor 188. A face cam 312 is mounted adjacent to and rotates with the cylindrical cam 306. The cylindrical cam has cut into a cam groove 314 which has a smoothly varying helix angle from a rear dwell portion 316 to a maximum helix angle at midposition to a forward dwell portion 318. A cam follower 320 mounted to the underside of the primary slide through a bracket 322 operates in the cam groove 314.

A secondary slide base 324 is mounted on the primary slide 304 and mounts a secondary slide 326 which operates in a plane substantially perpendicular to the plane of operation of the primary slide 304. A clevis bracket 328 is mounted to the secondary slide 326 which is connected to link 300 by pivot pin 330. The downward motion of the secondary slide, which is unpowered, is limited by a stop 332 mounted on the primary slide 304. The secondary slide 326 is held against this stop 332 by an L-shaped lock lever 334 which engages a fixed lug 336 on the secondary slide 326; the lock lever 334 is pivoted on the primary slide 304 through a pin 338 and bracket 340. The lock lever 334 is actuated by a roller 342 which cooperates with the face cam 312 as will be described; a third section of the lock lever 334 actuates a bellcrank 344 pivot mounted in the frame extension 302 through a pin 346, which in turn actuates the plunger 142 as in FIG. 6. A spring 348, operating between lock lever 334 and the underside of the primary slide 304 exerts a clockwise torque on the lock lever 334. A cam follower roller 350 is mounted on the bracket 328 on the secondary slide 326. This roller 350 cooperates with an adjustable cam 352 mounted on a bracket 354 which, in turn, is mounted on the frame extension 302.

The position of the mechanism shown in FIG. 23 corresponds to a position of the carriage 6 fully returned. For rapid advance, the motor 188 and gear reducer 310 drive the cam 306 through slightly more than one revolution, driving the roller 320 from its position in return dwell 316 to a position in the forward dwell 318. This advances the primary slide 304, with the secondary slide 326 locked thereon through a distance equal to the distance between the dwells on the cam 306. The smoothly varying helix angle on the cam generates a smoothly accelerated-decelerated motion of the primary slide 304. This motion is transmitted through the link 300 to the carriage 6 as its rapid advance stroke.

It will be recalled that during this rapid advance stroke, the clutch mechanism within the gear box 100 is disengaged and the ball screw is driven by the axial movement of the ball nut 14. It can also be seen that the total rapid advance stroke of the carriage 6 and link 300 is less than the stroke of primary slide 304, since the movement of the primary slide 304 is along a line inclined to the line of movement of the carriage 6, and only that component of movement of the primary slide 304 projected onto the line of movement of carriage 6 is effective in moving the carriage along its path. At the end of this rapid advance stroke, the roller 350 is in the position designated 350a.

Near the end of the rapid advance stroke of the primary slide 304, the roller 342 enters the plane of the face cam 312, and, at the end of the rapid advance stroke, with the roller 320 in the forward dwell 318, a rising ramp on the face cam 312, acting on the roller 342, causes the lock link 334 to rotate a short distance counterclockwise about the pin 338, compressing spring 348. This causes the bellcrank 344 to rotate clockwise about pin 346, driving the plunger 142 into the gear box 100 engaging the ball screw clutch connection to its driving system; concurrently, the hook section of the lock lever 334 clears the lug 336 on the secondary slide 326 permitting it to slide upward on the secondary slide base 324.

The feed stroke now begins; the feed motor 124 is energized and drives the ball screw 18 through the gear box 100. The carriage 6 moves forward at feed speed as driven by the ball nut 14; the link 300 is pulled along with it. This causes the secondary slide 326 to move upward (and to the left) on the secondary slide base 324. This feed movement continues until the roller 350, starting from the position 350a, reaches the position 350b contacting the cam 352. When this occurs, further feed motion is arrested, and the worm gear 56 contacts the limit switch 78, stopping the feed motor as described before, and the feed stroke is completed.

The motor 188 is energized in the reverse direction causing the cams 312 and 306 to rotate in the opposite direction from that of the rapid advance stroke. The cam roller 342 rides off the rise ramp on cam 312, permitting the spring 348 to rotate the lock lever 342 clockwise through a small distance bringing it back to the position shown in FIG. 23. This releases the bellcrank 344, and permits the plunger 142 to return to its "out" position disengaging the clutch on the ball screw 18 from its drive system. Continued further rotation of the cams 312 and 306 causes the roller 320 in cam groove 314 to smoothly accelerate and decelerate the primary slide 304 to its returned position with the roller 320 in return dwell 316.

This motion of the primary slide through its return stroke (upward and to the right) causes the roller 350 reacting on the cam 352 to move the secondary slide 326 downward on the secondary slide base 324; and since this downward movement of the secondary slide 326 also has a component to the right, a superposition and additive motion is induced in the link 300 to "make up" for the previously made feed stroke. The position of the roller 350 at the beginning of this rapid return stroke is denoted as 350b; during this rapid return stroke, this roller moves along the surface of the cam 352 as it moves from position 350b back to its starting position 350. At the end of the rapid return stroke, the secondary slide 326 has returned to its position against stop 332 and the lock lever 334 re-engages the lug 336 locking the secondary slide 326 in its lowermost position ready for the next rapid advance stroke.

The length of the feed stroke is controlled by the length of the induced stroke of the secondary slide permitted by the position of cam 352, as shown by the distance between roller positions 350a and 350b. The actual feed stroke permitted is indicated by the component of this distance parallel to the line of travel of carriage 6. Therefore, the length of the feed stroke is adjustable by changing the slope of the cam 352 with the added provision that the rightmost section of this cam have the constant position required to return the secondary slide 326 against the stop 332 at or before the primary slide 304 reaches its fully returned position.

The lines of action of the primary and secondary slides are shown as being inclined approximately 45° to the line of action of the carriage 6, and approximately 90° to each other. This need not be. Some variations on clearly permissable and depend on the desired ratios of rapid advance stroke to anticipated feed stroke range. For example, if very long rapid advance strokes are used, the angle of inclination of the primary slide may be reduced to 30° or even less, while leaving the secondary slide inclined at 45° as shown.

FIG. 25 is a variation on the embodiment of FIG. 23, in which the secondary slide is replaced by a substantially equivalent pivoted link. It will be understood that the cam systems, gear box 100 and all other mechanisms not shown in FIG. 25 are identical with those described in connection with FIGS. 23 and 24. Referring to FIG. 25, a bracket 360 is mounted to the primary slide 304, and in turn supports a pivoted link 362 through a pivot pin 364. The pivoted link 362 rests against a stop 366 on the primary slide 304 against which it is held by the lock lever 334. It will be noted that a portion of the link 362 is formed into a latch section 368 which is adapted to cooperate with the lock lever 334. The link 300 is pivot connected to the link 362 through a pivot pin 370; this pin 370 extends beyond the link 362 and supports a cam follower roller 372 which cooperates with the cam 352.

The mechanism in FIG. 25 is shown in its fully returned position. The rapid advance stroke is created by the primary slide 304 driven by the cam 306 as described in the mechanism of FIG. 23. At the end of the rapid advance stroke, the lock lever 334 is moved away from the latch portion 368 of the link 362 which thereby becomes free to rotate in a clockwise direction about the pin 364. This is again accomplished by the face cam 312 and the lock lever 334 again causes the plunger 142 to engage the feed clutch. During feed, as generated by the lead screw, the link 300, acting through pin 370, causes the link 362 to rotate about pin 364; the roller 372 which is at position 372a at the end of rapid advance, moves in an arc to position 372b during the feed stroke, which is terminated when the roller 372 contacts cam 352. During the rapid return stroke, the primary slide 304 is driven to its return position by the cam 306. This induces a superimposed counterclockwise rotation of the link 362 about the pin 364 as the roller 372, moving from position 372b back to its returned position 372 along the face of cam 352 is forced by said cam to return the link 362 back against its stop 366, whereupon the link 362 is locked in this position by the lock lever 334, and the mechanism is ready for the next cycle. It can be seen that, in this embodiment, it is the counterclockwise rotation of the link 362 during the return of the primary slide 304 which adds or makes up the amount of the previous feed stroke.

In the mechanisms of FIGS. 23 and 25, the motion generating mechanism for the rapid advance and rapid return strokes is comprised of a cylindrical or barrel cam which drives a cam follower operating in a groove or cam track therein. It can be seen that this same type of mechanism can be employed to create the fixed angular motion required by the primary link 152 in FIG. 6, or to create the fixed longitudinal movement of the rack member 260 in FIG. 20. Similarly, it can be seen that the motion generating mechanism of FIG. 6 comprised of elements 160 to 182, or any of the mechanisms of FIGS. 17-19 can be applied to the embodiments of FIGS. 23 and 25 to operate the primary slide 304.

Another embodiment of this invention is shown in FIGS. 26-29. In this embodiment, the secondary slide is mounted on the carriage, and the method of actuating the lock is altered compared to the system of FIG. 20.

Referring to FIGS. 26-28, revised frame extensions 380 are mounted to the gear box 100 in which is journalled the accelerating-decelerating mechanism shown in FIG. 11, and this comprises, in FIG. 26, an eccentric gear 162 mounted on shafts 168 and 170, and in mesh with a rack member 382 in this embodiment. The rack member 382 is connected to a bracket 384 through a pin 386; the bracket 384 in turn is mounted on a secondary slide 388 slideably connected to a secondary slide base 390 mounted on the carriage 6 which also supports the tooling 12. It will be noted that the line of action of the slide 388 is inclined to the line of action of the carriage 6 by an angle of approximately 60°, but this is not critical. It will also be understood that, during the feed stroke, the carriage 6 is driven by a ball nut 14 and ball screw 18 operated, as shown in FIG. 5, through the clutch mechanism in the gear box 100, which is actuated by the plunger 142, as previously described.

An extension 392, FIG. 27, on the bracket 384 mounts a cam follower roller 394 which cooperates with a cam 396 mounted to the slide base 2 through a spacer 398. The bracket 384 further supports a lock block 400 in which a lock member 402 is mounted for sliding operation; the lock member 402 has a double taper wedge nose which engages a mating tapered cavity in a reaction block 404 mounted on the upper end of the secondary slide base 390. As can be seen from the enlarged section of FIG. 28, the lock member 402 incorporates a shoulder 406 which seats a compression spring 408 mounted within the lock block 400 and acting to seat the lock member 402 into the reaction block 404.

The other external end of the lock member 402 is connected through a pivot pin 410 to an actuator rod 412. This actuator rod 412 passes freely through a T-lever 414 journalled on a shaft 416 mounted in the frame extensions 380. The outboard end of the rod 412 carries an enlarged cap section 418 which is too large to pass through the hole in the T-lever 414. The opposite leg of the T-lever 414 contacts the plunger 142 which actuates the clutch mechanism in the gear box 100. A compression spring 420, mounted between the gear box 100 and the T-lever 414, exerts a counterclockwise torque on the T-lever 414 about its mounting shaft 416. The center leg of the T-lever 414 mounts a cam follower roller 422 which is engaged by a cam 424 mounted on the shaft 168 of the accelerating-decelerating drive mechanism.

The mechanism of FIG. 26 is shown in its returned position. It will be noted that in this position, the cam 424 acting through the roller 422 is holding the T-lever 414 in its most clockwise position; the plunger 142 is therefore depressed and the clutch is engaged. This, however, is of no consequence, since the accelerating-decelerating mechanism is in dwell.

To accomplish the rapid advance stroke, the drive gear 162 makes one revolution counterclockwise imparting a smoothly accelerated-decelerated motion to the rack member 382 to the left (FIG. 26). During the first 10° of rotation of drive gear 162, the cam 424 rides off the follower roller 422, permitting the spring 420 to rotate the T-lever counterclockwise and the plunger 142 moves to the right disengaging the feed mechanism clutch. Therefore, the ball screw 18 is free to rotate.

The rack member 382 drives the carriage 6 to the left for its rapid advance stroke through the pin 386, bracket 384, slide 388 and slide base 390; the slide 388 is, during this stroke, locked to the slide base 390 through the lock member 402, which prevents relative motion therebetween. At the end of the rapid advance stroke, the cap 418 on the rod 412 contacts or stops very close to the mating face of the T-lever 414. The rack 382, carriage 6, and rod 412 have reached their dwell position before the drive gear 162 has completed its full revolution. At this time, during the last approximate 10° of rotation of the drive gear 162 and cam 424, the cam 424 again contacts and actuates the follower roller 422 to rotate the T-lever through a small clockwise angle.

This simultaneously actuates the plunger 142 to the left, engaging the clutch and ball screw feed system, and imparts a motion to the right to rod 412 through cap 418, withdrawing the lock member 402 from the reaction block 404. The slide 388 is therefore free to move on the slide base 390. The feed motor is energized to drive the carriage 6 further to the left through the ball screw 18 and nut 14 as the tools are fed into the workpiece. Since the rack member 382 is now held longitudinally stationary by the gear 162, this further leftward motion of the carriage 6 causes the slide 388 to move downward on the slide base 390. The rack member 382 must therefore roll counterclockwise of the gear 162, which it is permitted to do through its inherent connection therewith. During the rapid advance motion, the roller 394 moved from its returned position to the position designated 394a in FIG. 26. During the feed stroke, the roller 394 moves downward in an arc of very large radius with the slide 388 until a tangency position with the cam 396 is reached as shown by position 394b. The slide 388 is now prevented from moving further downward, and, consequently, the carriage 6 can move no further to the left; the ball screw stalls, the worm gear 56 moves to trip the switch 78, as previously described, and the feed motor stops.

During this feed stroke, the leftward movement of the carriage 6 induced a downward movement of the slide 388 on the slide base 390, due to the inclination of the two lines of action of the slides. If, at the final position of the carriage 6, the slide 388 is hypothetically returned to the vertical position on the slide base 390 which it had at the start of feed, the center of the roller 394 is found to be at point 426. The horizontal distance between point 426 and the true position of the roller at the start of feed 394a is the feed stroke permitted by the slide, roller, and cam combination. Once again, it can be seen that the position of cam 396 determines the length of the feed stroke permitted; the higher the cam, the less feed allowed.

The rapid return stroke is again created by a single clockwise revolution of the gear 162. During the first approximate 10° of the rotation of gear 162 and cam 424, the cam rides off the roller 422, disengaging the ball screw clutch through T-lever 414 and plunger 142. As the rack member 382 is moved to the right by the gear 162, it pulls the carriage 6 with it through pin 386, bracket 384, slide 388 and slide base 390. A regenerative motion is superimposed on the carriage 6 by the upward motion of the slide 388 on the slide base 390, this upward motion being forced by the action of cam 396 and roller 394 on the bracket 384. At or near the end of this rapid return stroke, the slide 388 has reached its normal up position on the slide base 390, and the lock member 402, under the influence of spring 406, relocks the slide 388 in this position ready for the next rapid advance stroke.

It will be noted that the lock mechanism in this embodiment is double acting and no stop is required for the slide 388. Furthermore, the lock member 402 is a sliding rather than a pivoted member. An alternate lock design employing a double acting pivoted member is shown in FIG. 29. It will be understood that this can replace the assembly made up of elements 400–408 in the embodiment of FIG. 26. Referring to FIG. 29, a lock member 426 is pivot mounted to a lock block 428 through a pin 430, the block 428 being part of or attached to bracket 384. The lock member 426 incorporates a tapered protrusion 432 which fits in a double tapered mating cavity in a reaction block 434 mounted on the secondary slide base 390. A counterclockwise torque is applied to the lock member 426 by a spring 436 between it and the lock block 428, which keeps the lock member seated in the reaction block. The rod 412 is again used to release the lock member at the end of rapid advance and beginning of the feed stroke as before.

In FIGS. 30 and 31, a variation of the embodiment of FIGS. 26 and 27 is shown in which the secondary slide is replaced by a simple pivoted U link. It will be understood that the accelerating-decelerating drive mechanism and the lead screw drive mechanism and the clutch and lock actuating mechanisms are the same as described in connection with FIGS. 26 and 27 except that the upper leg of the T-link 414 is shortened to place the rod 412 below the level of the rack member 382.

Referring to FIGS. 30 and 31, the rack member 382 is connected to a U-link 440 through a pin 442 and clevis extensions 444 integral with or bolted to the U-link 440. This U-link 440 is pivotally connected to the carriage 6 through two stub shafts 446 on base plates 448. The normal position of the U-link 440 is against a stop 450 mounted on a bracket 452 mounted on the carriage 6. The U-link 440 is held against the stop 450 by a lock member 454 which is mounted with a sliding connection in a lock block 456 mounted on the transverse portion of U-link 440. The lock member is actuated by a spring in a manner comparable to that shown in FIG. 28. One end of the lock member 454 is formed into a latch section which, when the lock member is extended, forms a lock with a mating latch section 458 mounted on the bracket 452. The other end of the lock member is connected to the actuating rod 412 through a pivot pin 460; it will be recalled that this rod 412 is actuated at its other end by the T-lever 414 and cam 424. A cam follower roller 462 is mounted on one side of the U-link 440 and cooperates with a cam 464 mounted to the slide base 2 through a spacer 466.

The sequencing of the mechanism is substantially similar to that for the mechanisms of FIGS. 26 and 27, with the rapid advance strokes being completely identical. At the end of the rapid advance stroke, the lock member 454 is pulled clear of the latch section 458 and the ball screw clutch is engaged as previously described. As the carriage 6 is driven forward (to the left) during the feed stroke, the U-link 440 rotates in a clockwise direction about the stub shafts 446 whereby the rack member 382 again rotates counterclockwise by rolling on the gear 162. The connecting pin 442 between rack member 382 and U-link 440, which had moved to position 442a during rapid advance, moves downward in an arc about the moving center of rotation of the rack member 382 during the feed stroke, reaching a position 442b at the end thereof.

At this time, the cam follower roller 462 reaches a position 462b in tangency with the cam 464, thereby preventing further downward rotation of the U-link about shafts 446. It will be noted that the axis of the cam follower roller 462 is displaced from the axis of pin 442 for structural convenience. The ball screw is stalled and the feed drive motor stopped as previously described. The amount of the feed stroke so permitted is seen to be the horizontal distance between the pin position 442a and the hypothetical point 468 which is the position of the center of pin 442, if the U-link 440 were to be rotated about shafts 446 back up against its stop 450 with the carriage 6 in its end of feed position. This is the equivalent of the distance traveled by the carriage 6 during feed while the U-link 440 was moving downward to permit it.

The rapid return stroke is again caused by a single clockwise revolution of the drive gear 162. The rack member 382 in moving to the right pulls the carriage 6 with it through U-link 440. However, as the U-link 440 moves to the right, the cam follower roller 462, starting from its position 462b, is forced to roll up the ramp on the cam 464; this forces the U-link 440 to rotate upward with it, adding an additional component of motion to the carriage 6 with respect to the rack member 382. Near or at the end of the rapid return stroke, the cam follower roller 462 has forced the U-link 440 back against its stop 450 and the lock member 454 re-engages the latch section 458 and the mechanism is ready for its next rapid advance stroke.

In FIG. 32, a slight modification to the embodiment of FIGS. 30 and 31 is shown in which the cam follower roller is mounted to the slide base while the cam is mounted to the U-link. It will be understood that the remainder of the mechanism will be as described in connection with FIGS. 30 and 31.

Referring to FIG. 32, a cam follower roller 470 is mounted on a bracket 472 attached to the slide base 2, not shown. A cam 474 is mounted on the U-link 440 to cooperate with the stationary cam follower roller 470. These elements are shown in the relationship that exists at the end of the rapid return stroke and at the beginning of the rapid advance stroke, with the U-link 440 locked against the stop 450. During the rapid advance stroke, the carriage 6 and U-link 440 are moved to the left with the U-link 440 locked as before. At the end of the rapid advance stroke, the relationship of the cam 474 to the roller is shown by roller position 470a. It can be visualized that pictorially moving the roller 470 to the right to position 470a creates the same relative relationship between cam and roller as moving the cam to the left. Therefore, at the end of the rapid advance stroke, the relative position of cam to roller is shown by 474 and 470a. The U-link 440 is then unlocked as before and the carriage 6 and shafts 446 move to the left for feed, and the U-link 440 rotates downward through an arc shown as 476 until the cam 474 contacts the roller in position 470a, stopping the feed as before. During the rapid return stroke, the roller 470 rolling on the curved surface of cam 474 forces the cam and U-link 440 back into their locked position. It is clear that the system of FIG. 32 is merely an inversion of the cam and roller relationship of the embodiment of FIGS. 30 and 31. This same inversion can be applied to the other embodiments. Similarly, the various accelerating-decelerating mechanisms previously described apply to the embodiments of FIGS. 26–32.

In These various embodiments, during the rapid return stroke, the carriage 6 is made to travel through an amplified stroke relative to the rapid advance stroke. This amplification is created by a linkage which superimposes a second component on the return movement. This linkage functions very well as long as a unidirectional pulling force exists between the drive means and the carriage. This is generally the case because of the friction between the carriage and the slide base. However, in cases of large return speeds, this friction may be inadequate to prevent the carriage from trying to overrun the drive means during the decelerating portion of the rapid return stroke. This manifests itself by the cam follower roller trying to leave the cam surface and having the slide or link impact against its stop or lock. Several straightforward cures are available to correct this situation. One is to intentionally add additional friction to the system, such as tightening the way gibs. Another is to add a conventional snubbing device between the cam actuated link or slide and its associated support member. These snubbing devices are exemplified by small percharged hydraulic cylinders having no external connections and having a small piston orifice, or its equivalent, that creates a resistance to movement which is approximately proportional to the speed of the externally applied motion.

The clutch mechanism which operates between the ball screw 18 and its associated drive mechanism is comprised of a dog or tooth clutch as illustrated in FIGS. 6 and 7. This specific clutch design can be replaced by a variety of clutches among which are a single disc friction clutch, a multiple disc friction clutch, or even an electrically actuated clutch, in which case the plunger 142 would be functionally replaced by a limit switch. The clutch requirements are relatively simple, primarily since the engagement and disengagement take place at substantially zero velocity between the mating components.

A conventional ball screw mechanism is utilized to create the feed stroke, because of its high rigidity and mechanical advantage. In some applications, it may be advantageous to employ a constant speed rack and pinion system, in which case the pinion drive system would employ a clutch comparable to that used for the lead screw system.

It can be seen that the essential elements of this invention comprise, first, a substantially conventional constant speed drive system for the carriage which is used for the feed stroke, the preferred form of which is the ball screw and nut systems illustrated; second, a completely separate and alternate drive system which inherently generates accelerated-decelerated output motion, such as illustrated by the mechanisms of FIG. 6 and FIG. 20 and disclosed in my existing U.S. Pat. No. 3,789,676, for generating the rapid advance and rapid return strokes; third, a shifting system automatically selecting one or the other of the drive systems for operative connection to the carriage, and simultaneously effectively disengaging the other drive system from the carriage, as illustrated by the clutch mechanism associated with the lead screw, which cooperates with a locking lever system of the accelerating-decelerating mechanism such that only one or the other of drive systems is connected to the carriage while the other idles or free wheels along; and, fourth, a regenerative or adder mechanism, as illustrated by the various roller and cam mechanisms and the links or slides they control, which, during the return stroke of the accelerating-decelerating mechanism, causes the carriage to move through a stroke which is equal to the sum of the previous rapid advance and feed strokes.

Thus, the initial stroke, which brings the working tool up to the work, is controlled by a very rapid mechanism with suitable acceleration-deceleration characteristics and very accurately determinable stop points so that the tool can be brought close to work without danger of contact and breakage and without the need for a safety gap which takes time to close before the metal cutting actually starts. The return stroke can also be rapid and will add the work feed stroke to itself automatically to insure full and rapid retraction, again with the very desirable acceleration-deceleration characteristic.

In the claims certain generic terms are used to facilitate the definition. These will be correlated with the drawings and the specification as follows: The first drive means is made up of the bar 106 as illustrated in FIG. 5 coupled with the mechanism of FIG. 6, part 160, interconnecting links 152 and 185, and FIG. 11, drive pinion 162 on shafts 168 and 170. Equivalent first drive means are shown in FIGS. 17, 18, 19, 23 and 26.

The second drive means is the ball nut and screw together with the clutch illustrated in FIGS. 3 and 5 and in FIG. 6 at 18, 124, 126, 130 and 142.

The shift means includes the clutching means shown in FIG. 6; the locking means is shown in FIG. 6 at 212, 214 and in a number of other figures, namely, FIGS. 12, 20, 23, 25, 26 and 29. The operating means includes the cam means 210 of FIG. 6, the cam 298 of FIG. 20, the cam 312 of FIG. 23 and cam 424 of FIG. 26.

The adding means referenced in the claims includes a first regenerative means which in FIG. 6 is the cam 196, in FIG. 20 is the cam 292, in FIG. 23 is the cam 352, and in FIG. 26 is the cam 396, and in FIG. 30 is the cam 464.

The means described by the expression "multiple movably interconnecting adder members" which is interposed between said first drive means and said carriage takes various forms in the specification and drawings. In FIG. 6, this includes the pivoted link 152 which carries the pivoted link 185. These links are locked together in the initial motion powered by the first drive means. When the rapid stroke is completed, these parts are unlocked to permit further motion of the drive link powered by the second drive means. In FIG. 20, this "adder" combination is composed of links 264 and 288 which are locked to bracket 270 by line 274 in the rapid stroke and unlocked in the feed stroke to allow the additional motion. Additional "adder" mechanisms are shown in FIGS. 23, 25, 26, 30 and 32.

I claim:

1. In a machine tool feed system which comprises a slide base and a tool supporting sliding carriage movably mounted thereon and in which the motion pattern of said carriage comprises a first rapid advance stroke which moves the carriage and tools forward at a relatively high speed to bring the tools into close proximity to the workpiece, and a second forward feed stroke, at the end of the rapid advance stroke, with a relatively slow constant speed during which motion the tools are fed into the workpiece, and a rapid return stroke at a relatively high speed for a return stroke which is the sum of the rapid advance and feed strokes, a drive system for said carriage comprising:
   (a) a first drive means mounted to said slide base to generate a smoothly accelerated-decelerated reversible output motion, said drive means being selectively coupled to said carriage to generate said rapid advance and rapid return strokes,
   (b) a second drive means mounted to said slide base to generate a predetermined constant speed output motion, said second drive means being selectively coupled to said carriage to generate said feed stroke,
   (c) shift means operatively associated with said carriage, said first drive means, and said second drive means, said shift means being operable to selectively and singly couple one of said drive means to said carriage,
   (d) adding means operatively associated with said carriage and said first drive means comprising:
   1. adder members interposed between said first drive means and said carriage to maintain an extendible connection between said first drive means and said carriage, said adder members being locked together during said rapid advance stroke and extensible during said feed stroke,
   2. regenerative members operatively associated with said adder members and producing, in conjunction with said reversible first drive means, said rapid return stroke which is the sum of said previous rapid advance stroke and said previous feed stroke, said regenerative members operating on said adder members to positively return said adder members to a non-extended position during said rapid return stroke.

2. In a machine tool feed system which comprises a slide base and a tool supporting sliding carriage movably mounted thereon and in which the motion pattern of said carriage comprises a first rapid advance stroke which moves the carriage and tools forward at a relatively high speed to bring the tools into close proximity to the workpiece, and a second forward feed stroke, at the end of the rapid advance stroke, with a relatively slow constant speed during which motion the tools are fed into the workpiece, and a rapid return stroke at a relatively high speed for a return stroke which is the sum of the rapid advance and feed strokes, a drive system for said carriage comprising:
   (a) a first drive means mounted to said slide base which generates a fixed stroke smoothly accelerated-decelerated reversible output motion, said first drive means being selectively coupled to said carriage in a fixed ratio to generate a predetermined stroke smoothly accelerated-decelerated rapid advance stroke of said carriage for one direction of output of said first drive means, and said first drive means being selectively regeneratively coupled to said carriage in a variable ratio to generate a variable stroke, smoothly accelerated-decelerated rapid return stroke of said carriage for the other direction of output of said first drive means, with said rapid return stroke of said carriage equal to the sum of said previous rapid advance stroke and said feed stroke of said carriage, (b) a second drive means mounted to said slide base and selectively coupled to said carriage to generate a predetermined length constant speed feed stroke of said carriage, (c) shift means, operatively associated with said first drive means and said second drive means which couples said first drive means to said carriage and uncouples said second drive means from said carriage during said rapid advance stroke, and uncouples said first drive means from said carriage and couples said second drives means to said carriage during said feed stroke, and uncouples said second drive means from said carriage during said rapid return stroke, and (d) adding means operatively associated with said carriage and said first drive means comprising:

1. a first regenerative member mounted to said slide base,
2. multiple movably interconnected adder members interposed between and operatively connecting said first drive means and said carriage, and
3. a second regenerative member mounted to one of said multiple movably interconnected adder members, whereby said multiple movably interconnected adder members operate in three modes: a locked mode in which said multiple movably interconnected adder members are locked with respect to each other in a normal relationship and movable as a combined single body thereby transmitting the motion generated by said first drive means, operating in said one direction, to said carriage in a fixed ratio for said rapid advance stroke; an unlocked mode in which said multiple movably interconnected adder members are unlocked and are free to move with respect to each other from their said normal relationship to a spaced relationship as said carriage is actuated by said second drive means for said feed stroke while said first drive means is inoperative; and a regenerative mode in which said multiple movably interconnected adder members are driven from their spaced relationship to their normal relationship by said regenerative members as said first drive means, operating in said other direction, drives said carriage through said multiple movably interconnected adder members for a rapid return stroke of said carriage which is the sum of the previous said rapid advance stroke and the previous said feed stroke.

3. A drive system for said carriage as in claim 2 in which said first drive means comprises:

(a) a frame mounted on said slide base,
(b) a first shaft mounted for rotation in said frame,
(c) a gear concentric about a second shaft eccentrically mounted to said first shaft with the axis of said first shaft approximately intersecting the pitch line of said gear,
(d) a gear rack output member adapted to mesh with said gear,
(e) means journalled on said second shaft and engaging said gear rack output member and maintaining pitch line contact between said gear and said gear rack output member, and
(f) power means adapted to drive said first shaft through approximately one revolution in one direction for said rapid advance stroke and to drive said first shaft through approximately one revolution in the opposite direction for said rapid return stroke.

4. A drive system for said carriage as in claim 2 in which said first drive means comprises:

(a) a frame mounted on said slide base,
(b) a shaft mounted for rotation in said frame,
(c) a crank mounted on said shaft at its one end and supporting an eccentric crankpin at its other end,
(d) a connecting rod output member journalled on said crankpin, and
(e) power means adapted to drive said shaft through approximately one-half revolution for said rapid advance stroke and to drive said shaft through an opposite one-half revolution for said rapid return stroke.

5. A drive system for said carriage as in claim 2 in which said first drive means comprises:

(a) a frame mounted on said slide base,
(b) a gear rack mounted to said frame,
(c) a gear member adapted to mesh with said gear rack in rolling contact,
(d) means adapted to maintain said gear member in pitch line contact with said rack, as said gear member rolls on said rack,
(e) a connecting rod output member journalled on said gear member near the pitch line of said gear member, and
(f) power means adapted to move said gear member along said rack a distance substantially equal to one pitch circumference of said gear member starting and ending with said gear member journal connection to said output member substantially in pitch line contact with said gear rack and said power means rolls said gear member in one direction for said rapid advance stroke and rolls said gear member in the opposite direction for said rapid return stroke.

6. A drive system for said carriage as in claim 2 in which said first drive means comprises:

(a) a frame mounted on said slide base,
(b) a cam member for rotation in said frame,
(c) an output member mounted in said frame for movement along a predetermined path,
(d) cam follower means interconnecting said cam member and said output member, and
(e) power means adapted to drive said cam member through a predetermined angle for said rapid advance stroke and to drive said cam member through said predetermined angle in the opposite direction for said rapid return stroke.

7. A drive system for said carriage as in claim 6 in which said output member comprises a slide member mounted for straight line motion on said frame.

8. A drive system for said carrage as in claim 6 in which said output member comprises a link member journalled in said frame.

9. A drive system for said carriage as in claim 6 in which said cam member comprises a plate cam operating in a single plane having a groove cut therein, said groove being generally spiral in configuration and imparting a controlled acceleration and deceleration to said cam follower means operating in said groove.

10. A drive system for said carriage as in claim 6 in which said cam member comprises a cylindrical cam rotating about a fixed axis and having a groove cut therein generally helical in configuration, said groove imparting a controlled acceleration-deceleration to said cam follower means operating in said groove.

11. A drive system for said carriage as in claim 2 in which said second drive means comprise:
 (a) a ball nut mounted on said carriage,
 (b) a ball screw engaged by said ball nut, and journalled in said slide base, and
 (c) means for driving said ball screw at a substantially constant angular velocity, the operating of said last means being initiated and maintained through said shift means.

12. A drive system for said carriage as in claim 11 in which said means for driving comprises:
 (a) a worm wheel member adapted to drive said ball screw,
 (b) a worm gear member formed to mesh with said worm wheel member and journalled in said slide base for rotation and axial movement,
 (c) a spring member acting between said worm wheel member and said slide base and establishing a normal driving position for said worm gear member,
 (d) switch means mounted on said slide base and positioned to be actuated by axial movement of said worm gear member away from said normal position, and
 (e) power means associated with said switch means mounted on said slide base for rotating said worm gear member, whereby said worm gear member drives said worm wheel member which drives said carriage through said ball screw and said ball nut, until a predetermined thrust on said carriage is exceeded whereby said worm gear member moves axially against said spring member and actuates said switch means and terminates the operation of said power means.

13. A drive system for said carriage as in claim 2 in which said second drive means comprises:
 (a) a worm wheel member mounted for rotation in said slide base,
 (b) intermediate drive means operatively associated with said worm wheel member and said carriage,
 (c) a worm gear member formed to mesh with said worm wheel member and journalled in said slide base for rotation and axial movement,
 (d) a spring member acting between said worm wheel member and said slide base and establishing a normal driving position for said worm gear member,
 (e) switch means mounted on said slide base positioned to be actuated by axial movement of said worm gear member away from said normal position, and
 (f) power means associated with said switch means mounted on said slide base for rotating said worm gear member, whereby said worm gear member drives said worm wheel member which drives said carriage through said intermediate drive means, until a predetermined torque on said worm wheel member is exceeded, whereby said worm gear member moves axially against said spring member and actuates said switch means and terminates the operation of said power means.

14. A drive system for said carriage as in claim 2 in which said second drive means comprises a lead screw and nut incorporating recirculating balls whereby said lead screw is the driving member and the nut is the driven member during said feed stroke, and the nut is the driving member and the ball screw is the driven member during said rapid advance stroke and said rapid return stroke, said lead screw being uncoupled from said second drive means by said shift means during said rapid advance and rapid return strokes.

15. A drive system for said carriage as in claim 2 in which said shift means comprise:
 (a) clutching means interposed within said second drive means and selectively operable between two modes: a clutched mode whereby said second drive means is connected for driving to said carriage during said feed stroke; and an unclutched mode whereby said second drive means is not connected for driving to said carriage during said rapid advance stroke and during said rapid return stroke,
 (b) locking means mounted on one of said multiple movably interconnected adder members and engageable with the other of said multiple movably interconnected adder members for locking and selectively operable in one of three modes: a locked mode corresponding to said locked mode of said multiple movably interconnected adder members in which said locking means lock said multiple movably interconnected adder members together in their said normal relationship and said multiple movably interconnected adder members operate as a single body; an unlocked mode corresponding to said unlocked mode of said multiple movably interconnected adder members in which said multiple movably interconnected adder members are not locked together by said locking means but are free to move from their said normal relationship to their said spaced relationship; and a lockable mode corresponding to said regenerative mode of said multiple movably interconnected adder members in which said multiple movably interconnected adder members are not locked together by said locking means but said multiple movably interconnected adder members become relocked together by said locking means as soon as said multiple movably interconnected adder members regain their said normal position from their said spaced position,
 (c) operating means interrelating and actuating said clutching means and said locking means whereby at the end of said rapid advance stroke said operating means actuate said clutching means from said unclutched mode to said clutched mode and substantially simultaneously actuate said locking means from said locked mode to said unlocked mode, and whereby at the start of said rapid return stroke said operating means actuate said clutching means from said clutched mode to said unclutched mode and substantially simultaneously actuate said locking means from said unlocked mode to said lockable mode.

16. A drive system for said carriage as in claim 15 in which said clutching means comprise:

(a) a first clutch member operatively associated with said carriage, (b) a second clutch member operatively associated with said second drive means, (c) a spring member disposed between said clutch members and acting to hold said clutch members out of engagement, and (d) a clutch operating member operatively associated with one of said clutch members and displaceable to cause an engagement between said clutch members and a deflection of said spring member and thereby to form a driving connection between said carriage and said second drive means.

17. A drive system for said carriage as in claim 16 in which said first clutch member has formed in it a set of teeth formed to interdigitate with a mating set of teeth formed in said second clutch member.

18. A drive system for said carriage as in claim 15 in which said second drive means is comprised of a driven first portion comprised of a ball nut mounted on said carriage in engagement with a ball screw journalled in said slide base and a driving second portion comprised of a gear train operated by a rotary power source and said clutching means comprise:

(a) a first clutch member mounted on said ball screw, (b) a second clutch member journalled on the axis of said ball screw and driven by said gear train, (c) a spring member disposed between said clutch members and acting to hold said clutch members out of engagement, and (d) a clutch operating member operatively associated with said second clutch member and displaceable to cause an engagement between said clutch members and a deflection of said spring member and thereby to form a driving connection between said first and second portions of said second drive means and, in the absence of a displacement of said clutch operating member, not to form a driving connection between said clutch members, whereby said ball screw and said first clutch member are free to rotate as said carriage is moved by said first drive means.

19. A drive system for said carriage as in claim 18 in which said first clutch member has formed in it a set of teeth formed to interdigitate with a mating set of teeth formed in said second clutch member.

20. A drive system for said carriage as in claim 15 in which said locking means comprise:

(a) a movement restricting surface on each of said multiple movably interconnected adder members which contact each other when said multiple movably interconnected adder members are positioned in their said normal relationship and in their said locked mode thereby preventing movement between said multiple movably interconnected adder members in a first direction of relative movement, (b) a lock member movably mounted on one of said multiple movably interconnected adder members and having a latch portion formed to engage with a mating latch portion formed in the other of said multiple movably interconnected adder members, said latch portions being formed to prevent relative motion between said multiple movably interconnected adder members in a second direction of relative motion opposite said first direction of relative motion when said latch portions are engaged, said latch portions being engageable only when said movement restricting surfaces are in contact with each other, and (c) an elastic member mounted between said locking member and one of said multiple movably interconnected adder members and acting to engage said latch portion of said lock member with said latch portion of said multiple movably interconnected adder members, whereby said lock member has three positions corresponding to said three modes of said locking means: a locked position of said lock member corresponding to said locked mode of said locking means with said latch portion of said lock member engaged with said latch portion of said multiple movably interconnected adder members; an unlocked position of said lock member corresponding with said unlocked mode of said lock means with said latch portion of said lock member disengaged from said latch portion of said multiple movably interconnected adder members; and a lockable position of said lock member corresponding to said lockable mode of said locking means with said lock member biased toward said locked position by said elastic member but with said multiple movably interconnected adder members in their said spaced relationship and as said multiple movably interconnected adder members regain their normal relationship, said elastic member moves said lock member from its said lockable position to its said locked position.

21. A drive system for said carriage as in claim 20 in which said lock member is a link pivoted on one of said multiple movably interconnected adder members.

22. A drive system for said carriage as in claim 20 in which said lock member is a link pivoted on one of said multiple movably interconnected adder members and said operating means comprises a portion of said link adapted to actuate said clutching means such that said lock member simultaneously unlocks said multiple movably interconnected adder members and engages said clutching means.

23. A drive system for said carriage as in claim 20 in which said lock member is mounted to one of said multiple movably interconnected adder members through a sliding connection.

24. A drive system for said carriage as in claim 15 in which said locking means comprise:

(a) a lock member movably mounted on one of said multiple movably interconnected adder members and having an extended protruding portion formed to engage a mating cavity in the other of said multiple movably interconnected adder members with said protruding portion engageable in said mating cavity only when said multiple movably interconnected adder members are in their said normal relationship and when said protruding portion of said lock member is engaged in said mating cavity, said multiple movably interconnected adder members are locked together, and (b) an elastic member mounted between said lock member and said multiple movably interconnected adder members on which said lock member is mounted and acting to move said lock member in a direction to engage said protruding portion into said mating cavity, whereby said lock member has three positions corresponding to said three modes of said locking means: a locked position of said locked member corresponding to said locked mode of said locking means with said protruding portion of said lock member engaged in said mating cavity of said multiple movably interconnected adder members; an unlocked position of said lock member corresponding with said unlocked mode of said lock means with said protruding portion of said lock member disengaged from said mating cavity of said multiple movably interconnected adder members; and a lockable position of said lock member corresponding to said lockable mode of said locking means with said lock member biased toward said locked position by said elastic member but with said multiple movably interconnected adder members in their said spaced relationship and as said multiple movably interconnected adder members regain their normal relationship, said elastic member moves said lock member from its said lockable position to its said locked position.

25. A drive system for said carriage as in claim 24 in which said lock member is a link pivoted on one of said multiple movably interconnected adder members.

26. A drive system for said carriage as in claim 24 in which said lock member is mounted to one of said multiple movably interconnected adder members through a sliding connection.

27. A drive system for said carriage as in claim 15 in which said operating means comprise a cam member mounted on and rotating with said first drive means.

28. A drive system for said carriage as in claim 15 in which said operating means comprise a cam member mounted on and rotating with said first drive means and configured to actuate said locking means, and said locking means comprises a lock lever pivotally mounted on one of said multiple movably interconnected adder members and said lock lever is configured to actuate said clutching means whereby at the end of said rapid advance stroke said cam member actuates said locking means from said locked mode to said unlocked mode and said lock member of said locking means actuates said clutching means from said unclutched mode to said clutched mode and at the beginning of said rapid return stroke said cam member actuates said locking means to move from said unlocked mode to said lockable mode, and said lock member of said locking means actuates said clutching means from said clutched mode to said unclutched mode.

29. A drive system for said carriage as in claim 15 in which said operating means comprise:
 (a) a lever member pivotally mounted in said slide base and having a first portion configured to actuate said clutching means and having a second portion configured to actuate said locking means, and
 (b) a cam member mounted on and rotating with said first drive means and configured to actuate said lever member.

30. A drive system for said carriage as in claim 15 in which said first drive means comprises an orbiting member translating in a circulating path and said operating means comprise:
 (a) a cam member mounted on and rotating with said first drive means and configured to actuate said clutching means, and
 (b) a rod member pivotally connected at one end to said locking means and operationally associated at its other end with said orbiting member of said drive means.

31. A drive system for said carriage as in claim 2 in which said multiple movably interconnected adder members of said adding means comprises:
 (a) a first adder member movably mounted on said slide base and driven by said first drive means,
 (b) a second adder member movably mounted to said first adder member, and drivably connected to said carriage, and having two positions, a locked position with respect to said first adder member corresponding to said locked mode, and an unlocked position in which said second adder member is movable with respect to said first adder member corresponding to said unlocked mode and said regenerative mode, and said second regenerative member is mounted to said second adder member and cooperates with said first regenerative member to drive said second adder member to its said locked position relative to said first adder member to its said locked position relative to said first adder member during said regenerative mode of said multiple movably interconnected adder members.

32. A drive system for said carriage as in claim 31 in which said first adder member is mounted to said slide base through a sliding connection.

33. A drive system for said carriage as in claim 31 in which said first adder member is mounted to said slide base through a pivot connection.

34. A drive system for said carriage as in claim 31 in which said second adder member is mounted to said first adder member through a sliding connection.

35. A drive system for said carriage as in claim 31 in which said second adder member is mounted to said first adder member through a pivot connection.

36. A drive system for said carriage as in claim 31 in which said first regenerative member comprises a cam follower roller and said second regenerative member comprises a cam cooperating with said cam follower roller during said regenerative mode of said multiple movably interconnected adder members.

37. A drive system for said carriage as in claim 31 in which said first regenerative member comprises a cam and said second regenerative member comprises a cam follower roller copperating with said cam during said regenerative mode of said multiple movably interconnected adder members.

38. A drive system for said carriage as in claim 2 in which said multiple movably interconnected members of said adding means comprise:
 (a) a first adder member mounted on said carriage,
 (b) a second adder member driven by said first drive means and movably connected to said first adder member and having two positions, a locked position with respect to said first adder member corresponding to said locked mode, and an unlocked position in which said second adder member is movable with respect to said first adder member corresponding to said unlocked mode and said regenerative mode, and
 (c) said second regenerative member is mounted to said second adder member and cooperates with said first regenerative member to drive said second adder member to its said locked position relative to said first adder member during said regenerative mode of said multiple movably interconnected adder members.

39. A drive system for said carriage as in claim 38 in which said second adder member is mounted to said first adder member through a pivot connection.

40. A drive system for said carriage as in claim 38 in which said second adder member is mounted to said first adder member through a sliding connection.

41. A drive system for said carriage as in claim 38 in which said first regenerative member comprises a cam follower roller and said second regenerative member comprises a cam cooperating with said cam follower roller during said regenerative mode of said multiple movably interconnected adder members.

42. A drive system for said carriage as in claim 38 in which said first regenerative member comprises a cam and said second regenerative member comprising a cam follower roller cooperating with said cam during said regenerative mode of said multiple movably interconnected adder members.

43. A drive system for said carriage as in claim 2 in which multiple movably interconnected adder members of said adding means comprises:
 (a) a first adder member mounted on said carriage,
 (b) a second adder member driven by said first drive means and movably mounted to said carriage and having two positions, a locked position with respect to said first adder member corresponding to said locked mode, and an unlocked position in which said second adder member is movable with respect to said first adder member corresponding to said unlocked mode and said regenerative mode, and said second regenerative member is mounted to said second adder member and cooperates with said first regenerative member to drive said second adder member to its said locked position relative to said first adder member during said regenerative mode of said multiple movably interconnected adder members.

44. A drive system for said carriage as in claim 43 in which said second adder is mounted to said carriage through a pivot connection.

45. A drive system for said carriage as in claim 43 in which said first regenerative member comprises a cam follower roller and said second regenerative member comprises a cam cooperating with said cam follower roller during said regenerative mode of said multiple movably interconnected adder members.

46. A drive system for said carriage in claim 43 in which said first regenerative member comprises a cam and said second regenerative member comprises a cam follower roller cooperating with said cam during said regenerative mode of said multiple movably interconnected adder members.

47. In a machine tool feed system which comprises a base and a tool supporting carriage movably mounted on said base and in which the motion pattern of said carriage comprises a first forward rapid advance stroke which displaces the carriage forwardly from a predetermined retracted start position to a predetermined intermediate position at a relatively high speed to advance the tool thereon into close proximity to the workpiece, a second forward feed stroke at the end of the rapid advance stroke wherein the tool is fed forwardly from said intermediate position at a relatively slow constant feed into the workpiece and then a third rapid return stroke wherein the carriage is returned to said retracted start position at a relatively high speed, a drive system for the carriage comprising:
 (a) a first drive means mounted to said base and adapted to generate a relatively rapid, smoothly accelerated-decelerated reversible output motion,
 (b) a second drive means mounted to said base and adapted to generate a predetermined relatively slow constant speed output motion,
 (c) first means for connecting the first drive means with the carriage to impart to the carriage said rapid advance and rapid return strokes,
 (d) second means for connecting the second drive means to the carriage to impart to the carriage said feed stroke, said first connecting means including a first output member reversibly driven by the first drive means during rapid advance and rapid return strokes and a second output member connected to the carriage in driving relation, said first and second output members being operably connected together for movement relative to each other, said first drive means causing said first output member to assume a predetermined start position relative to said base when the carriage is in said retracted start position,
 (e) latch means for locking said output members together in a predetermined fixed position relative to one another during the rapid advance stroke so that they move as a unitary member and thus cause displacement of the carriage substantially proportional to the displacement of the first output member during said rapid advance stroke,
 (f) means for releasing said latch means at the end of said rapid advance stroke to permit one of said output members to move relative to the other output member during the feed stroke when the carriage is being displaced by the second drive means,
 (g) regenerative means responsive to the reverse movement of the first output member during the rapid return stroke for moving said one output member back to said predetermined fixed position relative to the other output member to thereby return the carriage to said retracted start position when the first output member is returned to its start position by the first drive means, and
 (h) and shift means operable to selectively and singly couple one of said drive means with said carriage.

* * * * *